United States Patent
Cleveland et al.

(10) Patent No.: US 7,095,809 B2
(45) Date of Patent: Aug. 22, 2006

(54) PRACTICAL M-ARY DEMODULATOR USING HARD DECISION CIRCUIT AND METHOD OF OPERATION FOR USE IN A CDMA WIRELESS NETWORK BASE STATION

(75) Inventors: Joseph Cleveland, Richardson, TX (US); Adnan Kavak, Izmit (TR)

(73) Assignee: Samsung Electronics Co., Ltd., Suwon (KR)

( * ) Notice: Subject to any disclaimer, the term of this patent is extended or adjusted under 35 U.S.C. 154(b) by 533 days.

(21) Appl. No.: 10/037,454

(22) Filed: Dec. 31, 2001

(65) Prior Publication Data

US 2003/0123576 A1 Jul. 3, 2003

(51) Int. Cl.
*H03D 1/00* (2006.01)
(52) U.S. Cl. .................. 375/340; 375/147; 375/324; 329/304
(58) Field of Classification Search ............... 375/147, 375/324, 325, 326, 340, 344; 370/209, 320, 370/335, 342; 329/300, 304, 345
See application file for complete search history.

(56) References Cited

U.S. PATENT DOCUMENTS

| 5,469,469 A * | 11/1995 | Haines ................. 375/131 |
| 2003/0123523 A1* | 7/2003 | Cleveland et al. ......... 375/147 |
| 2003/0123577 A1* | 7/2003 | Cleveland .................. 375/340 |

* cited by examiner

*Primary Examiner*—Young T. Tse

(57) ABSTRACT

A demodulator for demodulating S possible orthogonal modulation codes received serially as binary data, wherein each of the S possible orthogonal modulation codes comprises M binary bits representing an N-bit data symbol and wherein $M=2^N$. The demodulator comprises Logic 00, Logic 01, Logic 10, and Logic 11 input detectors, each of which compares M/2 sequential pairs of the M binary bits of the orthogonal modulation codes to a respective one of a Logic 00 value, a Logic 01 value, a Logic 10 value, or a Logic 11 value and outputs a [+1,+1] signal if a match occurs and outputs a [−1,−1] signal if a match does not occur. An input decision circuit detects a [+1,+1] signal output by one of the input detectors after a comparison of a jth sequential pair of the M/2 sequential pairs of the M binary bits. In response to the detection, the input decision circuit adds the [+1,+1] signal to one or more of S accumulators if a jth one of the M/2 code mask bits in a corresponding one of a Logic 00 code mask, a Logic 01 code mask, a Logic 10 code mask, or a Logic 11 code mask is a Logic 1.

24 Claims, 6 Drawing Sheets

PRACTICAL M-ARY DEMODULATOR USING HARD DECISION CIRCUIT AND METHOD OF OPERATION FOR USE IN A CDMA WIRELESS NETWORK BASE STATION

CROSS-REFERENCE TO RELATED APPLICATIONS

The present invention is related to those disclosed in: 1) U.S. patent application Ser. No. 10/038,869, filed concurrently herewith and now issued U.S. Pat. No. 6,925,133, entitled "APPARATUS AND METHOD FOR M-ARY DEMODULATION IN A DIGITAL COMMUNICATION SYSTEM"; and 2) U.S. patent application Ser. No. 10/038, 873, filed concurrently herewith, entitled "PRACTICAL M-ARY DEMODULATOR AND METHOD OF OPERATION FOR USE IN A CDMA WIRELESS NETWORK BASE STATION".

U.S. patent application Ser. No. 10/038,869 and U.S. patent application Ser. No. 10/038,869, now issued U.S. Pat. No. 6,925,133, are commonly assigned to the assignee of the present invention. The disclosures of the related patent applications are hereby incorporated by reference for all purposes as if fully set forth herein.

TECHNICAL FIELD OF THE INVENTION

The present invention is directed, in general, to digital communication systems and, more specifically, to an M-ary demodulator for use in a wireless network base station.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

CDMA modulation employs a spread spectrum technique for the transmission of information. The CDMA wireless communications system spreads the transmitted signal over a wide frequency band. This frequency band is typically substantially wider than the minimum bandwidth required to transmit the signal. A signal having a bandwidth of only a few kilohertz can be spread over a bandwidth of more than a megahertz.

All of the wireless access terminals, including both mobile stations and fixed terminals, that communicate in a CDMA system transmit on the same frequency. Therefore, in order for the base station to identify the wireless access terminals, each wireless access terminal is assigned a unique pseudo-random (PN) long spreading code that identifies that particular wireless access terminal to the wireless network. Typically, each long code is generated using the electronic serial number (ESN) of each mobile station or fixed terminal. The ESN for each wireless access terminal is unique to that wireless access terminal.

In some CDMA wireless networks, during the transmission of user data from a wireless access terminal to a base station (i.e., reverse channel traffic), the user data are grouped into 20 millisecond (msec.) frames. All user data transmitted on the reverse channel are convolutionally encoded and block interleaved to form a baseband signal. In a preferred embodiment, the baseband signal is then modulated by an M-ary orthogonal modulation in which each N-bit data sequence or symbol is replaced by an orthogonal modulation code sequence of length $M=2^N$. The M-ary modulated signal is then spread using a long code based on the ESN data and then separated into an in-phase (I) component and a quadrature (Q) component prior to quadrature modulation of an RF carrier and transmission.

Next, the I-component is modulated by a zero-offset short pseudo-random noise (I-PN) binary code sequence. The Q-component is modulated by a zero-offset short pseudo-random noise (Q-PN) binary code sequence. In an alternate embodiment, the quadrature binary sequence may be offset by one-half of a binary chip time. Those skilled in the art will recognize that the in-phase component and the quadrature component are used for quadrature phase shift keying (QPSK) modulation of an RF carrier prior to transmission. Those skilled in the art will also recognize that the access terminal may use binary phase shift keying (BPSK) modulation, quadrature amplitude modulation (QAM) or other digital modulation format for modulation of an RF carrier for transmission of the data signals prior to transmission.

For IS-95 and IS-2000 based systems, the M-ary modulation uses $M=2^6$ orthogonal binary sequences for 6-bit encoding. In other words, six (N=6) bit blocks (or symbols) of the encoded and interleaved baseband signal are represented by one of $2^6$ (i.e., 64) unique codes. In 64-ary modulation used in current CDMA systems, one of 64 possible Walsh codes is transmitted for each group of six (6) coded bits of the baseband signal. Within a Walsh function, sixty-four (64) Walsh chips are transmitted. The particular Walsh function is selected according to the relation:

$$\text{Walsh Function} = c_0 + 2c_1 + 4c_2 + 8c_3 + 16c_4 + 32c_5 \qquad (1)$$

where $c_5$ represents the last coded bit and $c_0$ represents the first coded bit in the six-bit group of baseband data. Upon receipt of the transmitted signal from the access terminal, the base station performs the inverse of this sequence to detect the transmitted user baseband data bits.

Those skilled in the art will recognize that instead of M-ary modulation described previously, the baseband signal may be spread with an M-bit Walsh code, a quasi-orthogonal function or a turbo code prior to up-conversion and modulation of an RF carrier for transmission.

For multipath propagation, the base station may employ spatial diversity reception with two independent receive paths to receive a fading signal from the kth access terminal. In a preferred embodiment, diversity reception comprises two or more antennas separated by a distance equal to ten (10) or more wavelengths of the received RF signal. Those skilled in the art will recognize that signals arriving at the two or more antennas from the same source are un-correlated with antennas separations of ten (10) or more wavelengths. That is, if the signal received by one antenna is faded, the signal received by another antenna is not faded. Each antenna is connected to receive circuitry that performs separate despreading, M-ary demodulation, de-interleaving and convolutional decoding functional blocks for processing each multipath signal received by the base station. If the signal from the access terminal to one of the antennas undergoes a fade, a signal on the radio path from the access terminal to the second antenna may not have be in a fade condition. A selector circuit selects the best signal from the multiple diversity receive circuits to mitigate the affects of fading.

In conventional CDMA systems, the M-ary demodulator for demodulation of the signal from the $k^{th}$ access terminal consists of a bank of matched filters needed to detect one out of the M possible N-bit data symbols. A separate bank of matched filters is required for processing the signal received on each path. Each matched filter consists of M stages for processing the M modulation symbol bits to detect one out of the M possible N-bit data symbols. This greatly increases the number of ASIC gates or DSP processing (instructions per second) to detect the one of $M=2^N$ possible N-bit data symbols (patterns) in demodulating the M-ary modulated signal.

Therefore, there is a need for an M-ary demodulator that reduces the signal processing complexity required to perform M-ary demodulation of M-ary modulated data symbols. In particular, there is a need for an M-ary demodulator that does not require a separate bank of matched filters on each received signal path, wherein each matched filter consists of M stages for processing the M modulation symbol bits.

SUMMARY OF THE INVENTION

To address the above-discussed deficiencies of the prior art, it is a primary object of the present invention to provide a demodulator for demodulating a set of S possible orthogonal modulation codes received serially as binary data, wherein each of the S possible orthogonal modulation codes comprises M binary bits representing an N-bit data symbol and wherein $M=2^N$. According to an advantageous embodiment of the present invention, the demodulator comprises: 1) a Logic 00 input detector, a Logic 01 input detector, a Logic 10 input detector and a Logic 11 input detector, wherein each of the Logic 00 input detector, the Logic 01 input detector, the Logic 10 input detector, and the Logic 11 input detector compares sequential pairs of the M binary bits of the serially received orthogonal modulation codes to a respective one of a Logic 00 value, a Logic 01 value, a Logic 10 value, and a Logic 11 value and outputs a [+1,+1] signal if a match occurs and outputs a [−1,−1] signal if a match does not occur; 2) a summation circuit comprising S accumulators; and 3) a storage array capable of storing S Logic 00 code masks, each of the S Logic 00 code masks associated with one of the S possible orthogonal modulation codes, wherein a kth Logic 00 code mask comprises M/2 Logic 00 code mask bits, each of the M/2 Logic 00 code mask bits associated with a corresponding one of M/2 sequential pairs of M binary bits in a kth orthogonal modulation code, wherein the each M/2 Logic 00 code mask bit is a Logic 1 if the corresponding sequential pair of the M binary bits in the kth orthogonal modulation code is equal to a Logic 00 value and is equal to Logic 0 otherwise. The demodulator further comprises: 4) an input decision circuit capable of detecting a [+1,+1] signal output by the Logic 00 input detector after a comparison of a jth sequential pair of the M/2 sequential pairs of the M binary bits to a Logic 00 value and, in response to the detection, adding the [+1,+1] signal to a Kth one of the S accumulators in the summation circuit if a jth one of the M/2 Logic 00 code mask bits in the Kth Logic 00 code mask in the storage array is equal to Logic 1.

According to one embodiment of the present invention, the storage array is further capable of storing S Logic 01 code masks, each of the S Logic 01 code masks associated with one of the S possible orthogonal modulation codes, wherein a kth Logic 01 code mask comprises M/2 Logic 01 code mask bits, each of the M/2 Logic 01 code mask bits associated with a corresponding one of M/2 sequential pairs of M binary bits in a kth orthogonal modulation code, wherein the each M/2 Logic 01 code mask bit is a Logic 1 if the corresponding sequential pair of the M binary bits in the kth orthogonal modulation code is equal to a Logic 01 value and is equal to Logic 0 otherwise.

According to another embodiment of the present invention, the input decision circuit is further capable of detecting a [+1,+1] signal output by the Logic 01 input detector after a comparison of a jth sequential pair of the M/2 sequential pairs of the M binary bits to a Logic 01 value and, in response to the detection, adding the [+1,+1] signal to a Kth one of the S accumulators in the summation circuit if a jth one of the M/2 Logic 01 code mask bits in the Kth Logic 01 code mask in the storage array is equal to Logic 1.

According to still another embodiment of the present invention, the storage array is further capable of storing S Logic 10 code masks, each of the S Logic 10 code masks associated with one of the S possible orthogonal modulation codes, wherein a kth Logic 10 code mask comprises M/2 Logic 10 code mask bits, each of the M/2 Logic 10 code mask bits associated with a corresponding one of M/2 sequential pairs of M binary bits in a kth orthogonal modulation code, wherein the each M/2 Logic 10 code mask bit is a Logic 1 if the corresponding sequential pair of the M binary bits in the kth orthogonal modulation code is equal to a Logic 10 value and is equal to Logic 0 otherwise.

According to yet another embodiment of the present invention, the input decision circuit is further capable of detecting a [+1,+1] signal output by the Logic 10 input detector after a comparison of a jth sequential pair of the M/2 sequential pairs of the M binary bits to a Logic 10 value and, in response to the detection, adding the [+1,+1] signal to a Kth one of the S accumulators in the summation circuit if a jth one of the M/2 Logic 10 code mask bits in the Kth Logic 10 code mask in the storage array is equal to Logic 1.

According to a further embodiment of the present invention, the storage array is further capable of storing S Logic 11 code masks, each of the S Logic 11 code masks associated with one of the S possible orthogonal modulation codes, wherein a kth Logic 11 code mask comprises M/2 Logic 11 code mask bits, each of the M/2 Logic 11 code mask bits associated with a corresponding one of M/2 sequential pairs of M binary bits in a kth orthogonal modulation code, wherein the each M/2 Logic 11 code mask bit is a Logic 1 if the corresponding sequential pair of the M binary bits in the kth orthogonal modulation code is equal to a Logic 11 value and is equal to Logic 0 otherwise.

According to a still further embodiment of the present invention, the input decision circuit is further capable of detecting a [+1,+1] signal output by the Logic 11 input detector after a comparison of a jth sequential pair of the M/2 sequential pairs of the M binary bits to a Logic 11 value and, in response to the detection, adding the [+1,+1] signal to a Kth one of the S accumulators in the summation circuit if a jth one of the M/2 Logic 11 code mask bits in the Kth Logic 11 code mask in the storage array is equal to Logic 1.

According to a yet further embodiment of the present invention, the demodulator further comprises a code selection circuit capable of reading a sum value from each the S accumulators and identifying an accumulator containing a maximum sum value.

In one embodiment of the present invention, the code selection circuit outputs one of $2^M$ N-bit data symbols corresponding to the identified accumulator containing the maximum value.

In another embodiment of the present invention, N=6 and $M=2^N=64$.

In still another embodiment of the present invention, S=64.

In yet another embodiment of the present invention, the orthogonal modulation codes are Walsh codes.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network base station.

Figure 1:
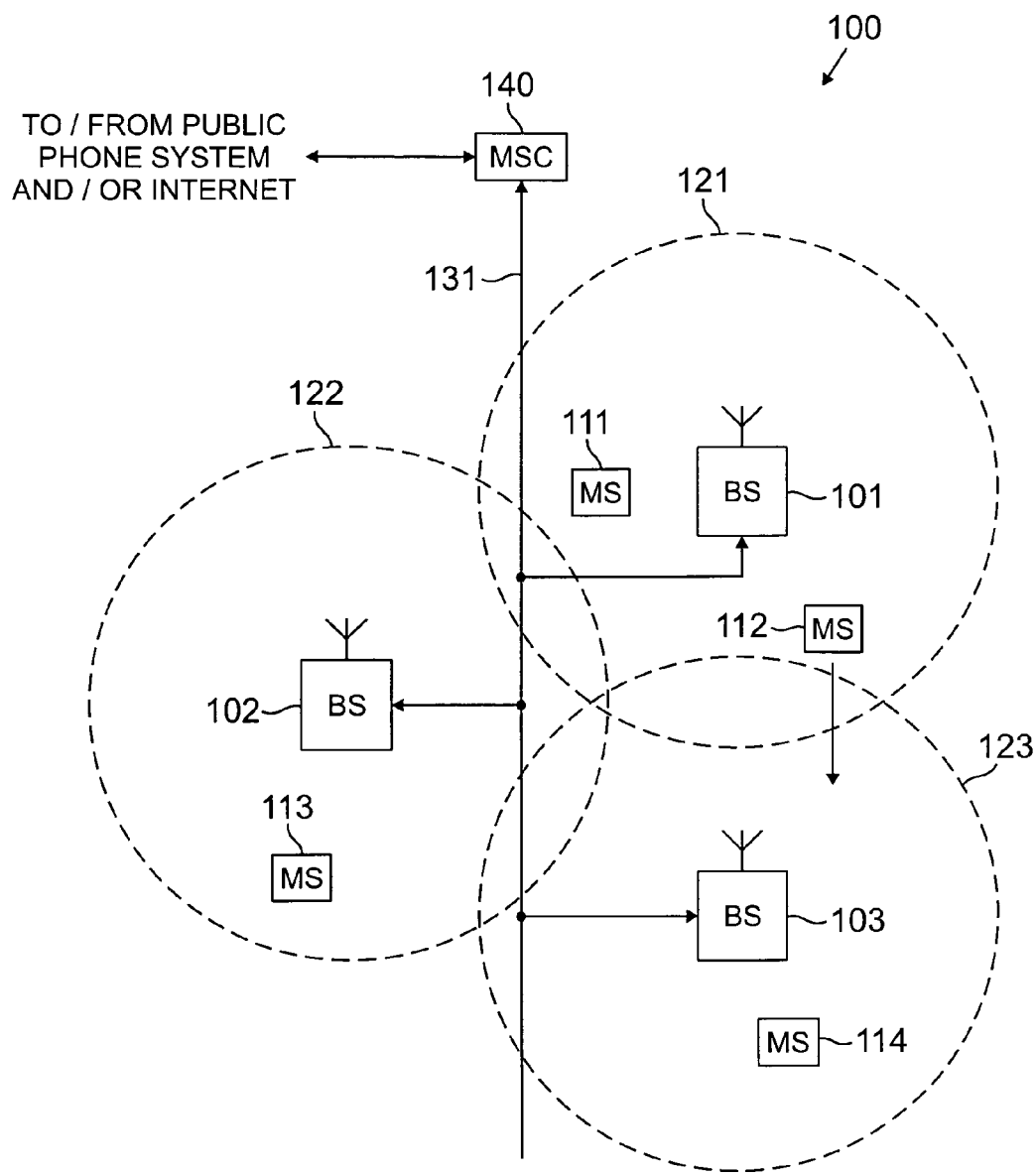
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 communicate with a plurality of mobile stations (MS) 111–114 over, for example, code division multiple access (CDMA) channels. Mobile stations 111–114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121–123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communications line 131 and mobile switching center MSC) 140. Line 131 also provides the connection path to transfers control signals between MSC 140 and BS 101, BS 102 and BS 103 used to establish connections for voice and data circuits between MSC 140 and BS 101, BS 102 and BS 103.

Communications line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may a provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103.

The above-described soft hand-off assumes the mobile station is in a voice or data call. An idle hand-off is a hand-off of a mobile station, between cells sites, that is communicating in the control or paging channel.

Figure 2:
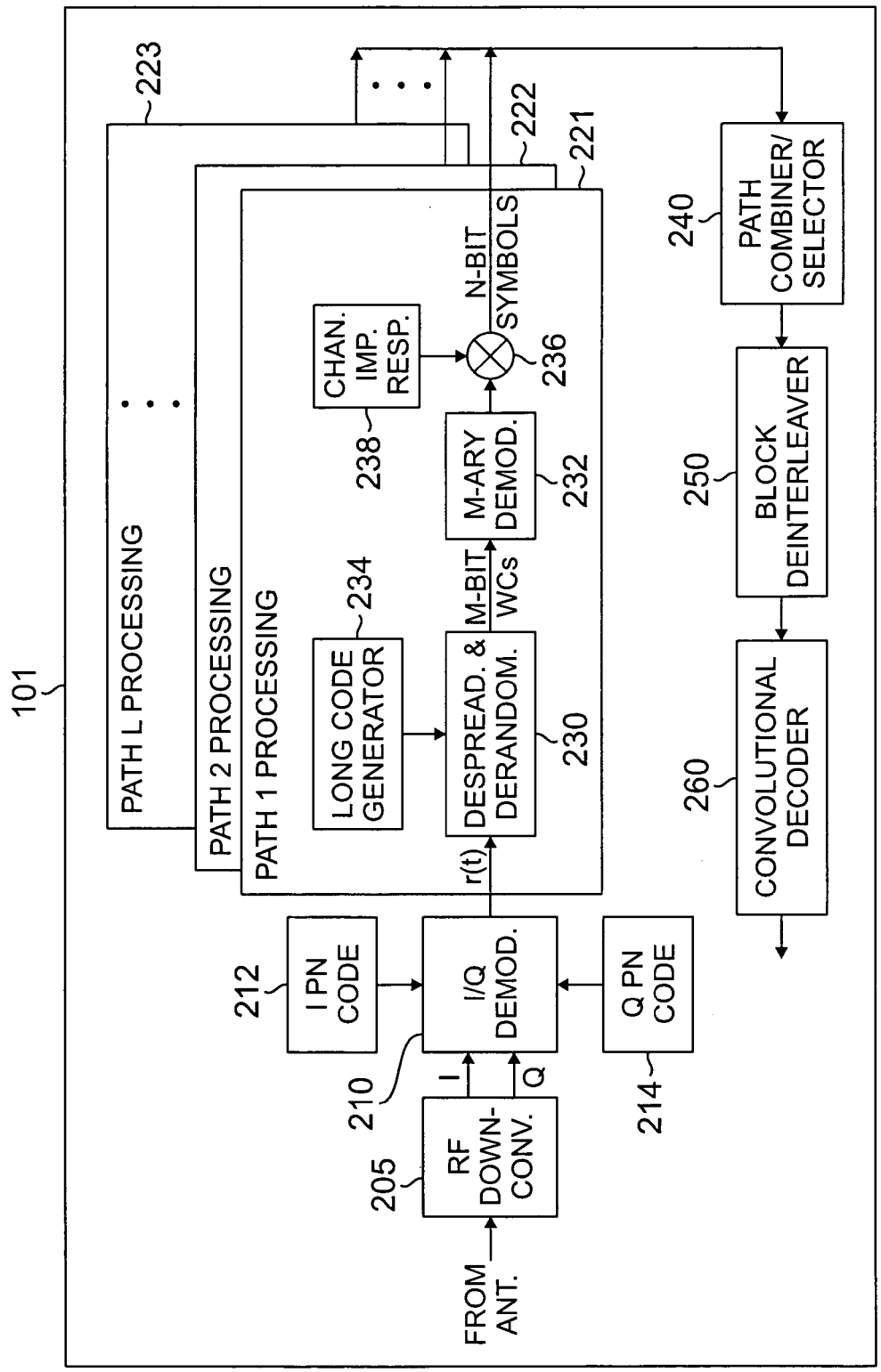
FIG. 2 illustrates selected portions of the receive path circuitry in the exemplary base station in greater detail according to one embodiment of the present invention.

FIG. 2 illustrates in greater detail selected portions of the receive path circuitry in a base transceiver subsystem (BTS) of exemplary base station 101 according to one embodiment of the present invention. The BTS receive path circuitry comprises radio frequency (RF) down-converter 205, in-phase and quadrature (I/Q) demodulation circuitry 210, in-phase (I) pseudo-random noise (PN) code generator 212, quadrature (Q) pseudo-random noise (PN) code generator 214, and L path processing circuits, including exemplary path processing circuits 221, 222, and 223, which are labeled Path 1 Processing, Path 2 Processing, and Path L Processing, respectively.

Those skilled in the art will recognize that exemplary path processing circuits 221, 222, and 223, may each contain in-phase and quadrature (I/Q) demodulation circuitry 210, in-phase (I) pseudo-random noise (PN) code generator 212, quadrature (Q) pseudo-random noise (PN) code generator 214 which are time offset to account for multipath delay. Exemplary path processing circuit 221 comprises de-spreading and de-randomizing block 230, long code generator 234, M-ary demodulator 232 according to the principles of the present invention, mixer 236, and channel impulse response block 238. Those skilled in the art of digital signal processing will also understand that a clock (not shown) controls and synchronizes the transfer of bits from one block to the next.

It is recalled from the above description of CDMA compatible wireless access terminals that, in conventional mobile stations and fixed access terminals, user data (i.e., voice data, e-mail, data files, web page data, and the like) to be transmitted on the reverse channel are convolutionally encoded and block interleaved to form a baseband signal. The baseband signal is then modulated by an M-ary orthogonal modulation and the M-ary modulated signal is spread using a long code based on the ESN data prior of the mobile station or fixed access terminal. The long code generated from the unique ESN data may be, for example, $2^{40}$ bits in length.

Following spreading with the long code, the signal is then demultiplexed or separated into an in-phase (I) component and a quadrature (Q) component prior to quadrature modulation of an RF carrier and transmission. The I-component is modulated by a zero-offset short pseudo-random noise (I-PN) binary code sequence. The Q-component is modulated by a zero-offset short pseudo-random noise (Q-PN) binary code sequence. The short code may be, for example, $2^{15}$ bits in length. In one embodiment, the quadrature binary sequence is further offset by one-half of a binary chip time. Those skilled in the art will recognize that the in-phase component and the quadrature component are used for quadrature phase shift keying (QPSK) modulation of an RF carrier prior to transmission.

Upon receipt of, for example, a QPSK-modulated RF signal in the reverse channel, the RF front-end of the BTS amplifies and filters the QPSK-modulated RF signal transmitted by one or more access terminals. RF down-converter 205 down-converts the amplified and filtered RF signal to produce an in-phase (I) component signal and a quadrature (Q) component signal. I/Q demodulation block 210 uses an I-PN code and a Q-PN code to produce the I and Q components to produce a digital signal stream, r(t), that represents the combination of signals from the transmitting access terminals. I/Q demodulation block compensates for the one-half chip time introduced in the Q-component by the access terminal prior to QPSK modulation and transmission.

De-spreading and de-randomizing block 230 then uses the $2^{40}$ bit ESN-based long code from long code generator 234 to perform coherent de-spreading and de-randomizing of r(t) from each access terminal signal using a matched filter. The output of de-spreading and de-randomizing block 230 is an orthogonal modulation symbol represented by a Walsh code sequence of $M=2^N$ bits. Next, M-ary demodulator 232 demodulates the sequence of bits (or chips) representing the Walsh code sequence. The demodulation circuit provides M-ary ($M=2^N$) demodulation of the stream of M-bit (i.e., M-chip) Walsh codes (i.e., symbols) to produce N-bit data symbols. For an exemplary IS-95 system, N=6 and M=64. The output of M-ary demodulator 232 is further filtered by mixer 236 and channel impulse response block 238 to produce a baseband signal comprising a stream of N-bit digital data symbols.

The N-bit symbols from each path are combined by path combiner/selector 240 and then de-interleaved by block de-interleaver 250. In one embodiment, combiner/selector 240 selects the strongest signal. In another embodiment, combiner/selector 240 selects the most probable N-bit symbol. Convolutional decoder 260 then convolutionally decodes the de-interleaved data bits to produce the original user data transmitted by the mobile station or fixed access terminal.

It should be noted that in the embodiments described herein, the number of Walsh codes, M, is equal to the number of bits or chips, M, in each Walsh code. However, this is not required. The number of bits in the Walsh code may be different than the number of Walsh codes. For example, in alternate embodiments of the invention, a digital communication system may be implemented that uses WC=64 Walsh codes, where each Walsh code contains, for example, M=16, 32, or 128 bits (or chips).

Figure 3:
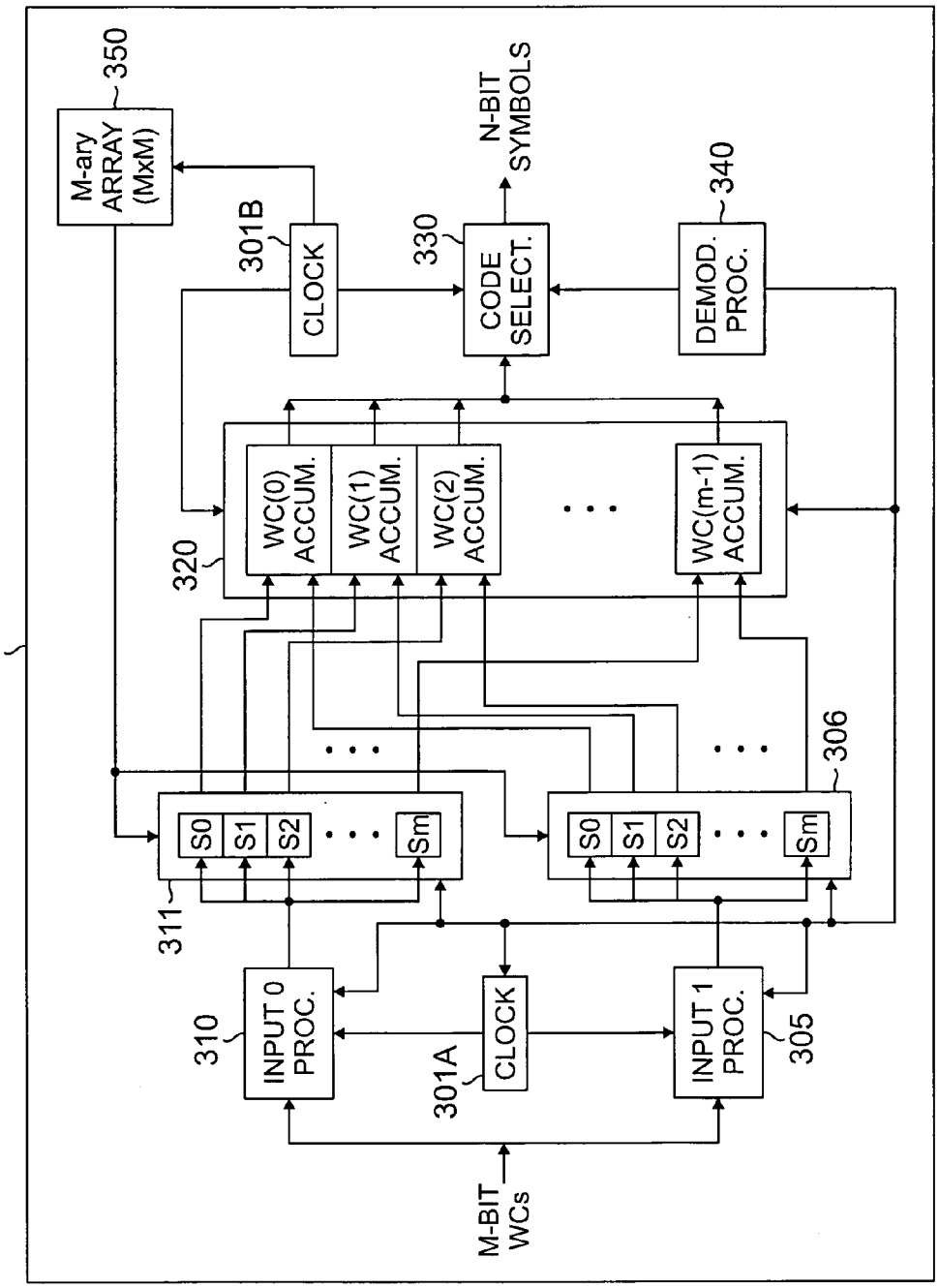
FIG. 3 illustrates in greater detail selected portions of an exemplary M-ary demodulator according to a first embodiment of the present invention.

FIG. 3 illustrates selected portions of simplified M-ary demodulator 232 in exemplary base station 101 in greater detail according to one embodiment of the present invention. M-ary demodulator 232 comprises clocks 301A and 301B, Input 1 processor 305, Input 0 processor 310, switch arrays 306 and 311, and summation block 320, and M-ary array 350, code selector 330, and demodulation processor 340. Clocks 301A and 301B are synchronized with the starting point and digital data rate of the M-ary modulation used by the transmitting access terminal and initialize the M-ary demodulation at the start of each set of M modulation code (i.e., Walsh code) bits.

Switch array 306 comprises M switches, labeled S0 through S(M−1). For example, if M=64, switch array comprises 64 switches, S0-S63. Similarly, switch array 311 comprises M switches, labeled S0 through S(M−1). Again, if M=64, switch array comprises 64 switches, S0-S63.

Summation block 320 comprises M accumulator circuits (or summers), labeled WC(0) Accumulator through WC(M−1) Accumulator. Each of the M accumulator circuits has two inputs and sums together the outputs of the input processors in order to detect a match to one of the M Walsh codes. Each of the switches S0-S(M−1) in switch array 306 connects the output of Input 1 processor 305 to a first one of the two inputs of each of WC(0) Accumulator—WC(M−1) Accumulator. Similarly, each of the switches S0-S(M−1) in switch array 311 connects the output of Input 0 processor 310 to the second one of the two inputs of each of WC(0) Accumulator—WC(M−1) Accumulator. Thus, each of the M accumulator circuits has one input coupled to the output of Input 1 processor 305 via one of the switches in switch array 306 and has its second input coupled to the output of Input 0 processor 310 via one of the switches in switch array 311.

As is well known, a cleanly received M-bit Walsh Code signal consists of M chip intervals during which the signal has either a positive amplitude, +A, or a negative amplitude, −A, with respect to a 0 volt reference level. The +A level comprises a +1 (or Logic 1) value and the −A level comprises a −1 (or Logic 0) value. Upon initialization to the start of the M bits (i.e., M chips) of the next Walsh code received from de-spreading and de-randomizing block 230, the M-bit Walsh code is input to Input 1 processor 305 and Input 0 processor 310. Input 0 processor 310 functions as a matched filter for a −1 (or Logic 0) state of a WC symbol bit (or WC chip). Input 1 processor 305 functions as a matched filter for a +1 (or Logic 1) state of the WC symbol bit. It is noted that the present invention reduces the matched filter for each code from M stages to two stages.

Each of the matched filter outputs of Input 1 processor 305 and Input 0 processor 310 has a relative value of +1 upon detection of the desired digital signal and −1 otherwise. In other words, if Input 1 processor 305 determines that the current WC chip has a level of +1 (i.e., detects a match for a Logic 1), Input 1 processor 305 outputs a +1 signal. However, if Input 1 processor 305 determines that the current WC chip has a level of −1 (i.e., does not match a Logic 1), Input 1 processor 305 outputs a −1 signal. Similarly, if Input 0 processor 310 determines that the current WC chip has level of −1 (i.e., detects a match for a Logic 0), Input 0 processor 310 outputs a +1 signal. However, if Input 0 processor 310 determines that the current WC chip has level of +1 (i.e., does not match Logic 0), then Input 0 processor 310 outputs a −1 signal.

At the same time that the input data are read into Input 1 processor 305 and Input 0 processor 310, demodulator processor 340 loads switch array 306 and 311 with the respective code mask from M-ary array 350. The outputs of Input 1 processor 305 and Input 0 processor 310 are loaded into switch arrays 306 and 311, respectively. Switch arrays 306 and 311 determine whether or not the outputs of Input 1 processor 305 and Input 0 processor 310 are transferred to summation block 320 according to the switch control signals in M-ary array 350.

If Input 1 processor 305 or Input 0 processor 310 indicates a match, a signal of relative value +1 is loaded into the selected WC(k) Accumulator in summation block 320. If Input 1 processor 305 or Input 0 processor 310 does not indicate a match, a signal of relative value −1 is loaded into the selected WC(k) Accumulator. This processes continues synchronously with the input data rate until all M input modulation symbol bits (i.e., all M Walsh code chips) have been processed.

At the completion of processing of M input orthogonal modulation symbol bits, demodulation processor 340 notifies code selector 330 to evaluate the output of each of the M accumulator circuits in summation block 320 to determine the most likely received and demodulated N-bit digital data symbol. An M-ary code (i.e., Walsh code) match produces a maximum value in one of the M accumulator circuits and a minimum value in all others. A maximum occurs for a demodulation code match since M signals of relative value +1 are loaded into the corresponding accumulator circuit in summation block 320. A minimum occurs in all other due to the occurrence of an equal number of +1 and −1 signals loaded into each of the remaining accumulator circuits in summation block 320 if a code match does not exist. Code selector 330 determines the N-bit data symbol pattern $[n_0, n_1, \ldots, n_{N-1}]$ by evaluating the expression from the kth WC accumulator from the expression:

$$N_0 = n_0 + 2n_1 + 4n_2 + 8n_3 + \ldots + 2^{N-1} n_{N-1}$$

That is, it functions as a digital matched filter for each expected N-bit data symbol. Demodulation processor 340 then initializes the M-ary demodulator for detection and demodulation of the next set of M orthogonal modulation symbol bits.

The contents of the M×M bit array in M-ary array 350 are shown in Appendix A below. The contents of M-ary array 350 provide an exemplary embodiment for 64-ary demodulation with M=64 modulated symbol chips (or bits) per N=6 user data bits for IS-95 and IS-2000.

The elements of the M×M matrix are obtained from the commutation of the Hadamard matrix given by:

$$H[1] = [0] \quad H[2^N] = \begin{bmatrix} H_{2^{N-1}} & H_{2^{N-1}} \\ H_{2^{N-1}} & \overline{H_{2^{N-1}}} \end{bmatrix}$$

Under control of clock 301B, at the start of each M-bit modulation symbol, the switch control signals in the first column of the M×M matrix are fed into switch arrays 306 and 311. Each row of the Hadamard matrix with N=6 defines Walsh code 0 to Walsh code 63.

For switch array 311, a 0 chip value in the $k^{th}$ position in the column causes switch S(k) in switch array 311 to transfer the +1 or −1 output of Input 0 processor 310 to WC(k) Accumulator in summation block 320. However, a 1 chip value in the $k^{th}$ position in the column causes switch S(k) in switch array 311 not to transfer (i.e., block) the +1 or −1 output of Input 0 processor 310 to WC(k) Accumulator in summation block 320.

For switch array 306, the switch logic is reversed. A 1 chip value in the kth position in the column causes switch S(k) in switch array 306 to transfer the +1 or −1 output of Input 1 processor 305 to WC(k) Accumulator in summation block 320. However, a 0 chip value in the $k^{th}$ position in the column causes switch S(k) in switch array 306 not to transfer (i.e., block) the +1 or −1 output of Input 1 processor 305 to WC(k) Accumulator in summation block 320. This process continues until all M input modulation symbol bits have been processed and the samples applied to the bank of M Walsh code accumulator blocks.

To further explain the operation of M-ary demodulator 232, an example is now given. In the following example, it is assumed that M=$2^6$=64. Thus, 64-ary demodulator 232 receives a sequence of 64-bit Walsh codes, and there are sixty-four (64) possible Walsh codes. Each Walsh code represents one of the 64 possible values of a 6-bit user data symbol. For example, user data symbol 000000 maybe be represented by Walsh code 0 (WC0), user data symbol 010010 may be represented by WC18, and the like. M-ary array 350 stores all 64 possible Walsh codes, WC0–WC63, in 64 rows, where each row contains the 64 chip values of a given Walsh code. Thus, Row 0 of M-ary array 350 derived from the Hadamard matrix for N=6 stores WC0 and Column 0 of Row 0 stores Chip 0 of WC0, Column 1 of Row 0 stores Chip 1 of WC0, Column 2 of Row 0 stores Chip 2 of WC0, and so forth, until the last column, Column 63, of Row 0 stores Chip 63 of WC0.

It is assumed that the next incoming M-ary code is Walsh code 11 (WC11) and it has been cleanly received (i.e., no corrupted chips/bits). WC11 occupies the twelfth row of M-ary array 350. WC11 begins with the eight chip sequence "01100110 . . . " and ends with the eight chip sequence ". . . 10011001". Thus, the first eight chips input to Input 1 processor 305 and Input 0 processor 310 are −1,+1,+1,−1,−1,+1,+1,−1 (which is equivalent to the logic values 01100110). Similarly, the first eight switch control signals shifted out of Row 11 of M-ary array 350 and applied to switches S11 in switch arrays 306 and 311 are 01100110.

As noted above, Input 1 processor 305 compares the chips of a received M-ary code to +1 and outputs a +1 if a match occurs and a −1 if a match does not occur. Thus, the first eight chips of the incoming M-ary signal, −1,+1,+1,−1,−1,+1,+1,−1, are compared to +1 and Input 1 processor 305 generates the output sequence −1,+1,+1,−1,−1,+1,+1,−1.

At the same time, Input 0 processor 310 compares the chips of a received M-ary code to −1 and outputs a +1 if a match occurs and a −1 if a match does not occur. Thus, the first eight chips of the incoming M-ary signal, −1,+1,+1,−1,−1,+1,+1,−1, are compared to −1 and Input 0 processor 310 generates the output sequence +1,−1,−1,+1,+1,−1,−1,+1.

As a result, during the first 8 chips of the M-ary code, switch S11 in switch array 306 receives the output sequence −1,+1,+1,−1,−1,+1,+1,−1 from Input 1 processor 305 and synchronously receives the switch control signal sequence 01100110 from Row 11 of M-ary array 350. It is recalled that when the switch control signal is Logic 1, switch S11 of switch array 306 closes and passes the output (+1 or −1) of Input 1 processor 305 to one input of WC(11) Accumulator in summation block 320 and when the switch control signal is Logic 0, switch S11 of switch array 306 opens and blocks the output (i.e., 0) of Input 1 processor 305 from being applied to one input of WC(11) Accumulator.

Thus, the switch control signal sequence 01100110 blocks the −1 values and passes the +1 values in the output sequence −1,+1,+1,−1,−1,+1,+1,−1 from Input 1 processor 305. Therefore, the output of switch S11 in switch array 306 is the sequence 0,+1,+1,0,0,+1,+1,0, which is applied to one input of WC(11) Accumulator.

Furthermore, during the first 8 chips of the M-ary code, switch S11 in switch array 311 receives the output sequence +1,−1,−1,+1,+1,−1,−1,+1 from Input 0 processor 310 and synchronously receives the switch control signal sequence 01100110 from Row 11 of M-ary array 350. It is recalled that when the switch control signal is Logic 0, switch S11 in switch array 311 closes and passes the output (+1 or −1) of Input 0 processor 310 to the second input of WC(11) Accumulator in summation block 320 and when the switch control signal is Logic 1, switch S11 in switch array 311 opens and blocks the output (i.e., 0) of Input 0 processor 310 from being applied to the second input of WC(11) Accumulator.

Thus, the switch control signal sequence 01100110 blocks the −1 values and passes the +1 values in the output sequence +1,−1,−1,+1,+1,−1,−1,+1 from Input 0 processor 310 . Therefore, the output of switch S11 in switch array 311 is the sequence +1,0,0,+1,+1,0,0,+1, which is applied to second input of WC(11) Accumulator.

Since the two inputs of WC(11) Accumulator are the sequence 0,+1,+1,0,0,+1,+1,0 from Input 1 processor 305 and the sequence +1,0,0,+1,+1,0,0,+1 from Input 0 processor 305, WC(11) Accumulator is incremented during each of the first 8 chips of the incoming 64-chip Walsh code. This process continues for the remaining 56 chips in WC11, so that WC(11) Accumulator contains a value of 64 at the end of the received 64-chip Walsh code. It should be noted that the inputs to WC11 accumulator are always +1.

However, this process only occurs for WC11 Accumulator, which detects Walsh Code 11. All of the other accumulators in summation block 320 are equal to 0 because the switch control signals from the other rows of M-ary array 350 do not match WC11. Thus, an equal number of +1 values and −1 values are randomly added by the other accumulators (i.e., summers) of summation block 320. This results in a value of 0 in the other accumulators.

In essence, the Logic 0 chips in WC11 stored in M-ary array 350 close switch S11 in switch array 311 during the known Logic 0 (or −1) chip intervals in the incoming M-chip Walsh code, during which intervals Input 0 processor 310 outputs a +1 signal. The Logic 1 chips in WC11 stored in M-ary array 350 open switch S11 in switch array 311 during the known Logic 1 (or +1) chip intervals in the incoming M-bit Walsh code, during which intervals Input 0 processor 310 outputs a −1 signal. Similarly, the Logic 1 chips in WC11 stored in M-ary array 350 close switch S11 in switch array 306 during the known Logic 1 (or +1) chip intervals in the incoming M-chip Walsh code, during which intervals Input 1 processor 305 outputs a +1 signal. Also, the Logic 1 chips in W11 stored in M-ary array 350 open switch S11 in switch array 306 during the known Logic 0 (or −1) chip intervals in the incoming M-chip Walsh code, during which intervals Input 1 processor 305 outputs a −1 signal. Thus, switch S11 in switch array 306 and switch S11 in switch array 311 only pass +1 values to WC11 Accumulator when the M-chip (M-bit) signal being received by Input 1 processor 305 and Input 0 processor 310 is Walsh code 11.

When code selector 330 determines that the output of WC(11) Accumulator is 64 and the output of the other accumulators are equal to 0, code selector 330 determines that WC11 has been received and outputs 001011, the 6-bit symbol that corresponds to WC11.

The present invention provides a technique to reduce the number of gates per demodulation path or finger in the base station receive path for demodulator implementation in ASICs or FPGAs. For demodulator implementation in a digital signal processor (DSP), the present invention reduces the number of instructions per second per demodulation path or finger in the base station receive processing. One consequence is a lower complexity for channel estimation used to determine beam forming coefficients for adaptive antenna technology in existing and future CDMA wireless base stations. The end result is reduced design cost, reduced numbers of ASICs and DSPs, and less circuit card space required to adapt adaptive antenna array technology.

Figure 4:
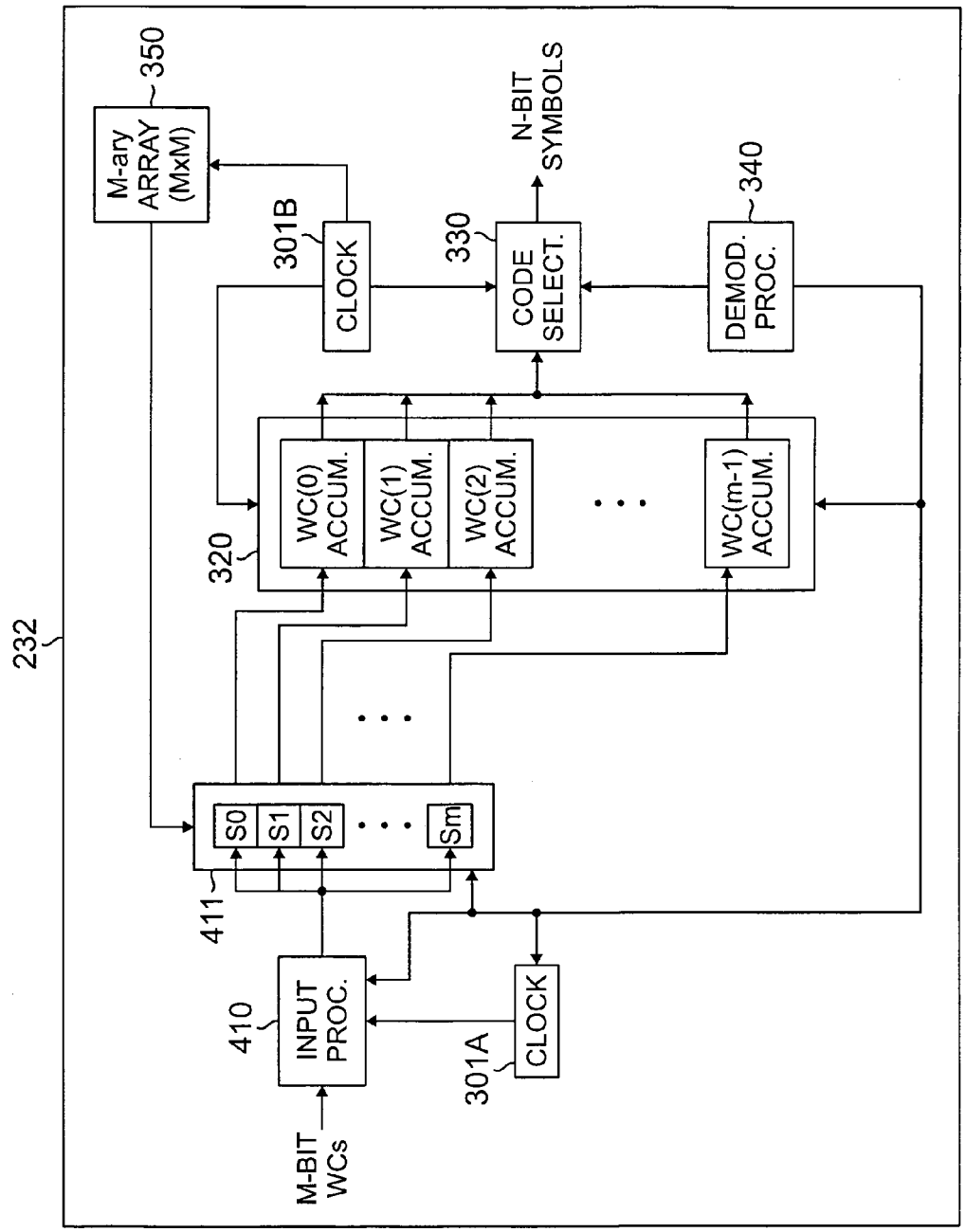
FIG. 4 illustrates selected portions of an exemplary M-ary demodulator according to a second embodiment of the present invention.

FIG. 4 illustrates selected portions of simplified M-ary demodulator 232 in exemplary base station 101 according to an alternate embodiment of the present invention. In the alternate embodiment, only one input processor and only one switch array are used. Input processor 410 stores a snapshot of the M-ary demodulated input signal under command from clock 301. Demodulation processor 340 loads switch array 411 for the 0 code then directs input processor 410 to send the samples to switch array 411, which routes the signals to WC(0) Accumulator—WC(63) Accumulator according to the settings in switch array 411. The accumulators then process the Logic 0 input signals when strobed by clock 301. Demodulation processor 340 then loads switch array 411 for the Logic 1 code and directs input processor 410 to send the samples to switch array 411, which routes the signals to WC(0) Accumulator—WC(63) Accumulator according to the settings in switch array 411. The accumulators then process the input 1 signals when strobed by clock 301. Demodulation processor 340 processor executes these two sequences within the time period of one M-ary modulation symbol bit.

The above-described embodiments may be further reduced by taking advantage of the properties of Walsh codes. It is noted that every Walsh code listed in Appendix A may be regarded as a sequence of thirty-two (32) bit-pairs of binary data, rather than sixty-four (64) individual bits of binary data. However, the 32 bit-pairs are made up of random sequences of two and only two unique pairs, starting from the first bit (or chip). For example, SW11 in Appendix A consists of sequences of 01 and 10 only. The first sixteen chips of WC11 are 0110011010011001, but may be re-written as 01 10 01 10 10 01 10 01. The bit-pairs 00 and 11 do not appear in WC11. Similarly, Walsh code 44 (WC44) consists of sequences of 00 and 11 only. The first 16 chips of WC44 are 0000111111110000, but may be re-written as 00 00 11 11 11 11 00 00. The bit-pairs 01 and 10 do not appear in WC44.

Accordingly, the embodiment of the present invention may be modified to use four (4) input processors that detect 00, 01, 10, and 11 binary data bit-pairs, instead of two input processors that detect only a single 0 or 1 binary bit. The binary data pairs are always an even bit (or chip) followed by an odd bit (or chip). For example, the first binary data pair are [Bit 0, Bit 1] of each Walsh code, the second binary data pair are [Bit 2, Bit 3], and so forth, and the last binary data pair are [Bit 14, Bit 15]. Generally, the binary data pairs may be represented as [Bit (2k), Bit (2k+1)] for k=0, 1, 2, 3, . . . , K, where K may be, for example, 15, 31, 63, or the like.

Figure 5:
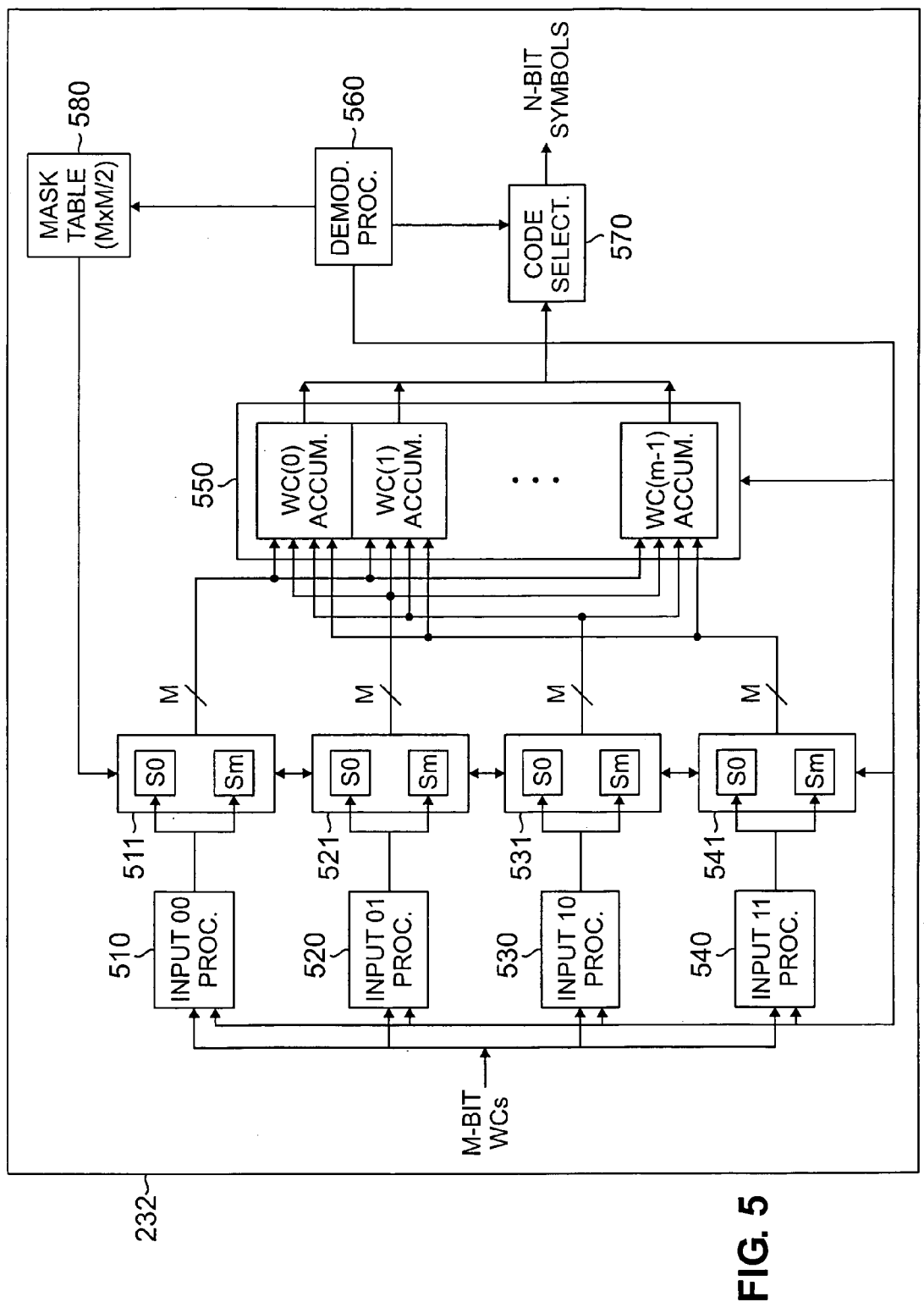
FIG. 5 illustrates selected portions of an exemplary M-ary demodulator according to a third embodiment of the present invention.

FIG. 5 illustrates selected portions of exemplary M-ary demodulator 232 according to a third embodiment of the present invention. M-ary demodulator 232 in FIG. 5 comprises Input 00 processor 510, Input 01 processor 520, Input 10 processor 530, Input 11 processor 540, switch arrays 511, 521, 531, and 541, summation block 550, demodulation processor 560, code selector 570 and mask table 580. Clocks are used to synchronize the switch arrays and the input processors with the starting point and digital data rate of the M-ary modulation used by the transmitting access terminal and to initialize the M-ary demodulation at the start of each set of M Walsh code (symbol) bits. For the purposes of simplicity and clarity, the clocks and clock lines are omitted from FIG. 5.

Upon initialization to the start of the next incoming M-bit Walsh code from de-spreading and de-randomizing block 230, the M-bit Walsh code is applied simultaneously to Input 00 processor 510, Input 01 processor 520, Input 10 processor 530, and Input 11 processor 540. Each input processor functions as a matched filter for its binary pair (i.e., 00, 10, 01, 11) and produces an output of [+1,+1] if the input signal contains the designated pair of binary bits. Under the control of demodulation processor 560, each input processor executes the matched filter according to an optimization algorithm for its respective binary pair.

During the time period for loading the input data into each input processor, demodulation processor 560 loads switch arrays 511, 521, 531, and 541 with the respective code masks from code mask table 580 corresponding to selection of the 00, 10, 01, 11 binary pairs. After execution of the matched filter in the input processors for detection of each of the 00, 10, 01, 11 possible binary combinations, the output of each input processor is loaded into the respective switch array. The switch arrays route the signals from the input processors to the summers (accumulators) according to the state of the M switches in each respective switch array. This process continues synchronously with the input data rate until all M input modulation symbol (i.e., Walsh code) bits have been processed (a pair at a time). If switch arrays 511, 521, 531, and 541 are filled for each binary pair processed by Input 00 processor 510, Input 01 processor 520, Input 10 processor 530, and Input 11 processor 540, the effective mask fill rate is:

Fill Rate=(Input Rate/2)·$2^n$

The array is filled with $2^N$ elements for every 2 input bits. For IS-95 or CDMA2000 with an input rate of $1.2288 \times 10^6$ chips per second, the fill rate is 39.322 Mbps.

At the completion of processing of M input symbol bits, demodulation processor 560 notifies the code selector 570 to evaluate the output of each of the accumulators (summers) to determine the most likely received and demodulated N-bit data symbol pattern. A code match will produce a maximum value in one of the WC Accumulators and a minimum value in all others. A maximum occurs for a demodulation code match since M signals of relative value +1 are coherently added in the WC accumulators. A minimum occurs because an equal number of signals of relative value +1 and −1 are coherently added in each WC accumulators if a code match does not exist. Code selector 570 determines the N-bit data symbol pattern [$n_0, n_1, \ldots, n_{N-1}$] associated with the accumulator with the maximum value by evaluating the expression from the $m^{th}$ Walsh code Summer from the expression:

$$m = n_0 + 2n_1 + 4n_2 + 8n_3 + \ldots + 2^{N-1} n_{N-1}$$

That is, it functions as a digital matched filter for each expected code. Demodulation processor 560 then initializes the M-ary demodulator for detection and demodulation of the next set of M modulation symbol bits.

The contents of code mask table 580 are shown in Appendices B, C, D and E, below. At a rate of one-half that of the input M-ary code digital stream, demodulation processor 560 loads each one of switch arrays 511, 521, 531, and 541 with the M/2 bits in the corresponding code mask given in Appendices B–E and initiates the transfer of the output of each input processor to the switch arrays. Code mask 00 in Appendix B comprises the switch control signals applied to switch array 511. Code mask 01 in Appendix C comprises the switch control signals applied to switch array 521. Code mask 10 in Appendix D comprises the switch control signals applied to switch array 531. Code mask 11 in Appendix E comprises the switch control signals applied to switch array 541.

The code masks in Appendices B–E are M×M/2 matrices derived from the table of 64-ary Walsh codes given in Appendix A. Each row in the table provides the Walsh code digital bit pattern. The elements of the matrix are obtained from the commutation of the Hadamard matrix given by:

$$H[1] = [0] \quad H[2^N] = \begin{bmatrix} H_{2^{N-1}} & H_{2^{N-1}} \\ H_{2^{N-1}} & \overline{H_{2^{N-1}}} \end{bmatrix}$$

For the bits in column pairs in Appendix A, designated by AB, for a given code and the bits in binary pairs for the input processor designated by Input XY, the entry in the switch array for switch XY (SXY) is given by the logical expression:

$$S = \overline{A} \cdot \overline{B} \cdot \overline{X} \cdot \overline{Y} + \overline{A} \cdot B \cdot \overline{X} \cdot Y + A \cdot \overline{B} \cdot X \cdot \overline{Y} + A \cdot B \cdot X \cdot Y$$

Figure 6:
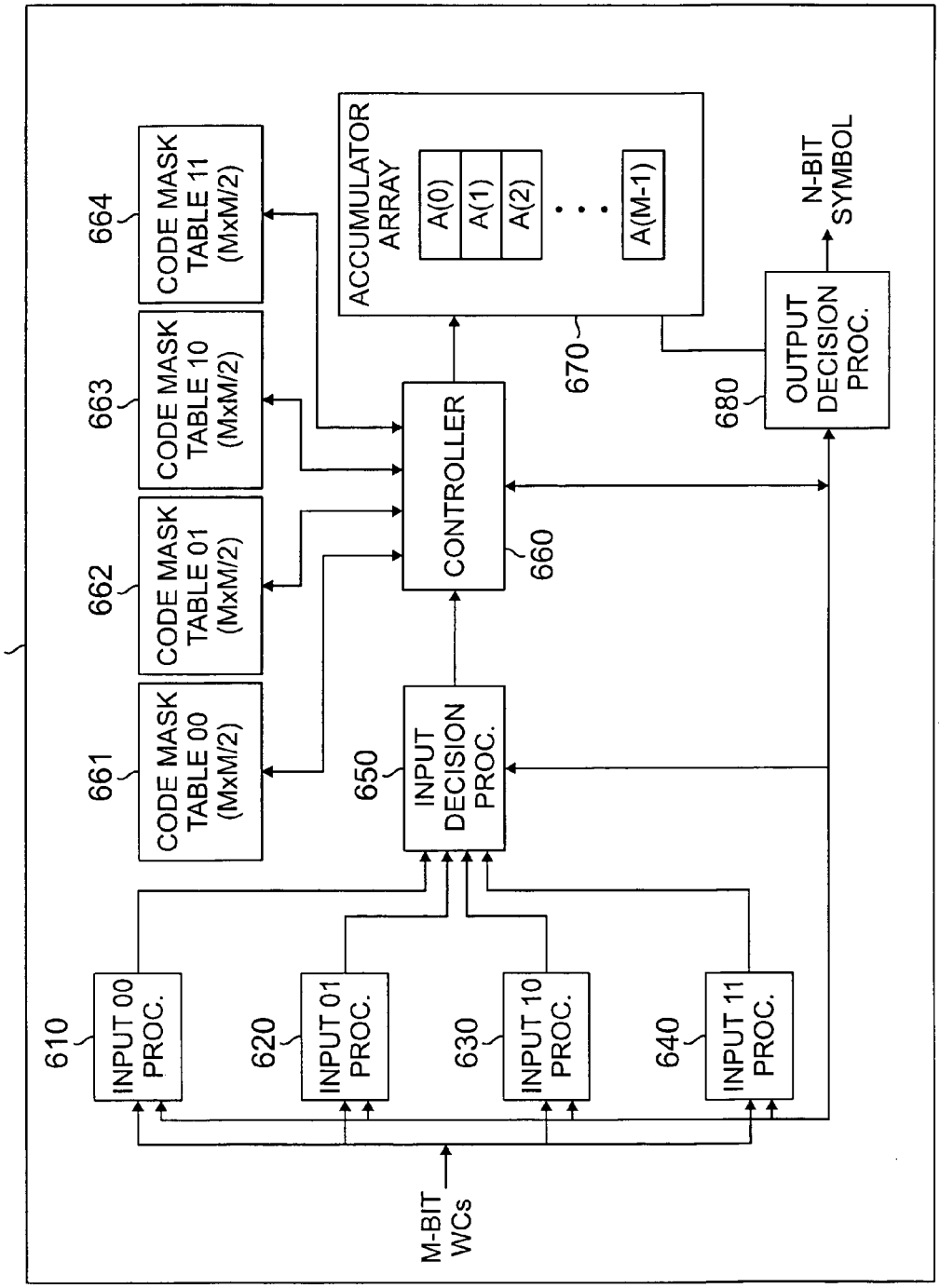
FIG. 6 illustrates selected portions of an exemplary M-ary demodulator according to a fourth embodiment of the present invention.

FIG. 6 illustrates selected portions of exemplary M-ary demodulator 232 according to a fourth embodiment of the present invention. M-ary demodulator 232 in FIG. 6 comprises Input 00 processor 610, Input 01 processor 620, Input 10 processor 630, and Input 11 processor 640, input decision processor 650, controller 660, code mask tables 661–664, accumulator array 670, and output decision processor 680. Each of Input 00 processor 610, Input 01 processor 620, Input 10 processor 630, and Input 11 processor 640 is a hard decision processor.

Upon initialization to the start of the next incoming M-bit Walsh code from de-spreading and de-randomizing block 230, the M-bit Walsh code is applied simultaneously to Input 00 processor 610, Input 01 processor 620, Input 10 processor 630, and Input 11 processor 640 which perform matched filtering to produce either a Logic 0 or Logic 1 output. Each input processor performs matched filtering operation between its designated binary pair (00, 01, 10, 11) and the portion of the incoming signal for the first two bits duration. At that point, only one of the input processors generates an output of 1. Each of the other three input processors generates an output of 0, which implies a no-match condition.

The outputs of the input processors and matched filters are fed to input decision processor 650, which provides information to controller 660 about which input processor matches to the incoming signal. Controller 660 loads the first column of the preset code mask table of the matched input processor. For example, if a match is found for Input 00 processor 610, controller 660 loads the first column from code mask table 661. Controller 660 then adds the values of the loaded column array to accumulator array 670. Accumulator array 670 has dimensions of M×1 and all of accumulators A(0) through A(M−1) are initially set to zero. Before the start of the time periods for the next two chip cycles of the incoming signal, input decision processor 650 must provide decision output to controller 660 and controller 660 must complete loading, storing, and adding the column of the code mask table.

For the next two chip periods, Input 00 processor 610, Input 01 processor 620, Input 10 processor 630, and Input 11 processor 640, input decision processor 650, and controller 660 perform the same operation as for the first two bits. This procedure is continually repeated until the end of M-bits of the M-ary modulated incoming signal. Meanwhile, the integer values are accumulated in M×1 accumulator array 670. For the $k^{th}$ code transmitted, a maximum occurs at the $k^{th}$ row of accumulator array 670. Based on accumulator array 670 output with the maximum value at the $k^{th}$ row, output decision processor 680 (or decoder) determines the N-bit data symbol pattern. The embodiment depicted in FIG. 6 eliminates the need for using four switch arrays as in the embodiment using soft decisions in FIG. 5.

This invention provides a technique to reduce the number of gates per demodulation path or finger in the base station receive processing for demodulator implementation in ASICs or FPGAs. Each input processor requires two multiplication and two addition operations at a time. Therefore, (M/2)×(1+(4×2))=9M/2 additions and 8M/2 multiplications are needed to complete M-ary demodulation using the present invention. However, the traditional approach using a bank of M matched filters require M×M additions and M×M multiplications. The Fast Hadamard Transform (FHT) method for M-ary demodulation performs butterfly operations and requires only MLog2(M) additions. Therefore, the methods in this invention provide computation complexity in between the FHT method and the bank of M matched filter method.

For demodulator implementation in DSPs, the present invention reduces the number of instructions per second per demodulation path or finger in the base station receive processing. One consequence is a lower complexity for channel estimation used to determine beam forming coefficients for adaptive antenna (i.e., Smart Antenna) technology in existing and future CDMA wireless base transceiver subsystems (BTS). The impact is reduced design cost, number of ASICS, DSPs, and circuit card space required to adapt adaptive antenna array technology (i.e., Smart Antennas) to current and future base stations that employ CDMA waveforms.

Although the present invention has been described in detail, those skilled in the art should understand that they can make various changes, substitutions and alterations herein without departing from the spirit and scope of the invention in its broadest form.

APPENDIX A

Walsh Symbol Set for 64-Ary Modulation

| Modulation Symbol Index | Walsh Chip within Symbol | | | | | | | | | | | | | | | |
|---|---|---|---|---|---|---|---|---|---|---|---|---|---|---|---|---|
| | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
| 0 | 0000 | 0000 | 0000 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 | 1111 | 0000 | 1111 |
| 5 | 0101 | 1010 | 0101 | 1010 | 0101 | 1010 | 0101 | 1010 | 0101 | 1010 | 0101 | 1010 | 0101 | 1010 | 0101 | 1010 |
| 6 | 0011 | 1100 | 0011 | 1100 | 0011 | 1100 | 0011 | 1100 | 0011 | 1100 | 0011 | 1100 | 0011 | 1100 | 0011 | 1100 |
| 7 | 0110 | 1001 | 0110 | 1001 | 0110 | 1001 | 0110 | 1001 | 0110 | 1001 | 0110 | 1001 | 0110 | 1001 | 0110 | 1001 |
| 8 | 0000 | 0000 | 1111 | 1111 | 0000 | 0000 | 1111 | 1111 | 0000 | 0000 | 1111 | 1111 | 0000 | 0000 | 1111 | 1111 |
| 9 | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |
| 24 | 0000 | 0000 | 1111 | 1111 | 1111 | 1111 | 0000 | 0000 | 0000 | 0000 | 1111 | 1111 | 1111 | 1111 | 0000 | 0000 |
| 25 | 0101 | 0101 | 1010 | 1010 | 1010 | 1010 | 0101 | 0101 | 0101 | 0101 | 1010 | 1010 | 1010 | 1010 | 0101 | 0101 |
| 26 | 0011 | 0011 | 1100 | 1100 | 1100 | 1100 | 0011 | 0011 | 0011 | 0011 | 1100 | 1100 | 1100 | 1100 | 0011 | 0011 |
| 27 | 0110 | 0110 | 1001 | 1001 | 1001 | 1001 | 0110 | 0110 | 0110 | 0110 | 1001 | 1001 | 1001 | 1001 | 0110 | 0110 |
| 28 | 0000 | 1111 | 1111 | 0000 | 1111 | 0000 | 0000 | 1111 | 0000 | 1111 | 1111 | 0000 | 1111 | 0000 | 0000 | 1111 |
| 29 | 0101 | 1010 | 1010 | 0101 | 1010 | 0101 | 0101 | 1010 | 0101 | 1010 | 1010 | 0101 | 1010 | 0101 | 0101 | 1010 |
| 30 | 0011 | 1100 | 1100 | 0011 | 1100 | 0011 | 0011 | 1100 | 0011 | 1100 | 1100 | 0011 | 1100 | 0011 | 0011 | 1100 |
| 31 | 0110 | 1001 | 1001 | 0110 | 1001 | 0110 | 0110 | 1001 | 0110 | 1001 | 1001 | 0110 | 1001 | 0110 | 0110 | 1001 |
| 32 | 0000 | 0000 | 0000 | 0000 | 0000 | 0000 | 0000 | 0000 | 1111 | 1111 | 1111 | 1111 | 1111 | 1111 | 1111 | 1111 |
| 33 | 0101 | 0101 | 0101 | 0101 | 0101 | 0101 | 0101 | 0101 | 1010 | 1010 | 1010 | 1010 | 1010 | 1010 | 1010 | 1010 |
| 34 | 0011 | 0011 | 0011 | 0011 | 0011 | 0011 | 0011 | 0011 | 1100 | 1100 | 1100 | 1100 | 1100 | 1100 | 1100 | 1100 |
| 35 | 0110 | 0110 | 0110 | 0110 | 0110 | 0110 | 0110 | 0110 | 1001 | 1001 | 1001 | 1001 | 1001 | 1001 | 1001 | 1001 |
| 36 | 0000 | 1111 | 0000 | 1111 | 0000 | 1111 | 0000 | 1111 | 1111 | 0000 | 1111 | 0000 | 1111 | 0000 | 1111 | 0000 |
| 37 | 0101 | 1010 | 0101 | 1010 | 0101 | 1010 | 0101 | 1010 | 1010 | 0101 | 1010 | 0101 | 1010 | 0101 | 1010 | 0101 |
| 38 | 0011 | 1100 | 0011 | 1100 | 0011 | 1100 | 0011 | 1100 | 1100 | 0011 | 1100 | 0011 | 1100 | 0011 | 1100 | 0011 |
| 39 | 0110 | 1001 | 0110 | 1001 | 0110 | 1001 | 0110 | 1001 | 1001 | 0110 | 1001 | 0110 | 1001 | 0110 | 1001 | 0110 |
| 40 | 0000 | 0000 | 1111 | 1111 | 0000 | 0000 | 1111 | 1111 | 1111 | 1111 | 0000 | 0000 | 1111 | 1111 | 0000 | 0000 |
| 41 | 0101 | 0101 | 1010 | 1010 | 0101 | 0101 | 1010 | 1010 | 1010 | 1010 | 0101 | 0101 | 1010 | 1010 | 0101 | 0101 |
| 42 | 0011 | 0011 | 1100 | 1100 | 0011 | 0011 | 1100 | 1100 | 1100 | 1100 | 0011 | 0011 | 1100 | 1100 | 0011 | 0011 |
| 43 | 0110 | 0110 | 1001 | 1001 | 0110 | 0110 | 1001 | 1001 | 1001 | 1001 | 0110 | 0110 | 1001 | 1001 | 0110 | 0110 |
| 44 | 0000 | 1111 | 1111 | 0000 | 0000 | 1111 | 1111 | 0000 | 1111 | 0000 | 0000 | 1111 | 1111 | 0000 | 0000 | 1111 |
| 45 | 0101 | 1010 | 1010 | 0101 | 0101 | 1010 | 1010 | 0101 | 1010 | 0101 | 0101 | 1010 | 1010 | 0101 | 0101 | 1010 |
| 46 | 0011 | 1100 | 1100 | 0011 | 0011 | 1100 | 1100 | 0011 | 1100 | 0011 | 0011 | 1100 | 1100 | 0011 | 0011 | 1100 |
| 47 | 0110 | 1001 | 1001 | 0110 | 0110 | 1001 | 1001 | 0110 | 1001 | 0110 | 0110 | 1001 | 1001 | 0110 | 0110 | 1001 |
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

APPENDIX B

Code Mask 00 Table

Modulation — Switch State per Walsh Chip Pair within the Walsh Symbol

| Symbol Index | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 0 | 1 1 | 1 1 | 1 1 | 1 1 | 1 1 | 1 1 | 1 1 | 1 1 | 1 1 | 1 1 | 1 1 | 1 1 | 1 1 | 1 1 | 1 1 | 1 1 |
| 1 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 2 | 1 0 | 1 0 | 1 0 | 1 0 | 1 0 | 1 0 | 1 0 | 1 0 | 1 0 | 1 0 | 1 0 | 1 0 | 1 0 | 1 0 | 1 0 | 1 0 |
| 3 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 4 | 1 1 | 0 0 | 1 1 | 0 0 | 1 1 | 0 0 | 1 1 | 0 0 | 1 1 | 0 0 | 1 1 | 0 0 | 1 1 | 0 0 | 1 1 | 0 0 |
| 5 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 6 | 1 0 | 0 1 | 1 0 | 0 1 | 1 0 | 0 1 | 1 0 | 0 1 | 1 0 | 0 1 | 1 0 | 0 1 | 1 0 | 0 1 | 1 0 | 0 1 |
| 7 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 8 | 1 1 | 1 1 | 0 0 | 0 0 | 1 1 | 1 1 | 0 0 | 0 0 | 1 1 | 1 1 | 0 0 | 0 0 | 1 1 | 1 1 | 0 0 | 0 0 |
| 9 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 10 | 1 0 | 1 0 | 0 1 | 0 1 | 1 0 | 1 0 | 0 1 | 0 1 | 1 0 | 1 0 | 0 1 | 0 1 | 1 0 | 1 0 | 0 1 | 0 1 |
| 11 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 12 | 1 1 | 0 0 | 0 0 | 1 1 | 1 1 | 0 0 | 0 0 | 1 1 | 1 1 | 0 0 | 0 0 | 1 1 | 1 1 | 0 0 | 0 0 | 1 1 |
| 13 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 14 | 1 0 | 0 1 | 0 1 | 1 0 | 1 0 | 0 1 | 0 1 | 1 0 | 1 0 | 0 1 | 0 1 | 1 0 | 1 0 | 0 1 | 0 1 | 1 0 |
| 15 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 16 | 1 1 | 1 1 | 1 1 | 1 1 | 0 0 | 0 0 | 0 0 | 0 0 | 1 1 | 1 1 | 1 1 | 1 1 | 0 0 | 0 0 | 0 0 | 0 0 |
| 17 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 18 | 1 0 | 1 0 | 1 0 | 1 0 | 0 1 | 0 1 | 0 1 | 0 1 | 1 0 | 1 0 | 1 0 | 1 0 | 0 1 | 0 1 | 0 1 | 0 1 |
| 19 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 20 | 1 1 | 0 0 | 1 1 | 0 0 | 0 0 | 1 1 | 0 0 | 1 1 | 1 1 | 0 0 | 1 1 | 0 0 | 0 0 | 1 1 | 0 0 | 1 1 |
| 21 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 22 | 1 0 | 0 1 | 1 0 | 0 1 | 0 1 | 1 0 | 0 1 | 1 0 | 1 0 | 0 1 | 1 0 | 0 1 | 0 1 | 1 0 | 0 1 | 1 0 |
| 23 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 24 | 1 1 | 1 1 | 0 0 | 0 0 | 0 0 | 0 0 | 1 1 | 1 1 | 1 1 | 1 1 | 0 0 | 0 0 | 0 0 | 0 0 | 1 1 | 1 1 |
| 25 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 26 | 1 0 | 1 0 | 0 1 | 0 1 | 0 1 | 0 1 | 1 0 | 1 0 | 1 0 | 1 0 | 0 1 | 0 1 | 0 1 | 0 1 | 1 0 | 1 0 |
| 27 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 28 | 1 1 | 0 0 | 0 0 | 1 1 | 0 0 | 1 1 | 1 1 | 0 0 | 1 1 | 0 0 | 0 0 | 1 1 | 0 0 | 1 1 | 1 1 | 0 0 |
| 29 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 30 | 1 0 | 0 1 | 0 1 | 1 0 | 0 1 | 1 0 | 1 0 | 0 1 | 1 0 | 0 1 | 0 1 | 1 0 | 0 1 | 1 0 | 1 0 | 0 1 |
| 31 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 32 | 1 1 | 1 1 | 1 1 | 1 1 | 1 1 | 1 1 | 1 1 | 1 1 | 0 0 | 0 0 | 0 0 | 0 0 | 0 0 | 0 0 | 0 0 | 0 0 |
| 33 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 34 | 1 0 | 1 0 | 1 0 | 1 0 | 1 0 | 1 0 | 1 0 | 1 0 | 0 1 | 0 1 | 0 1 | 0 1 | 0 1 | 0 1 | 0 1 | 0 1 |
| 35 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 36 | 1 1 | 0 0 | 1 1 | 0 0 | 1 1 | 0 0 | 1 1 | 0 0 | 0 0 | 1 1 | 0 0 | 1 1 | 0 0 | 1 1 | 0 0 | 1 1 |
| 37 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 38 | 1 0 | 0 1 | 1 0 | 0 1 | 1 0 | 0 1 | 1 0 | 0 1 | 0 1 | 1 0 | 0 1 | 1 0 | 0 1 | 1 0 | 0 1 | 1 0 |
| 39 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 40 | 1 1 | 1 1 | 0 0 | 0 0 | 1 1 | 1 1 | 0 0 | 0 0 | 0 0 | 0 0 | 1 1 | 1 1 | 0 0 | 0 0 | 1 1 | 1 1 |
| 41 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 42 | 1 0 | 1 0 | 0 1 | 0 1 | 1 0 | 1 0 | 0 1 | 0 1 | 0 1 | 0 1 | 1 0 | 1 0 | 0 1 | 0 1 | 1 0 | 1 0 |
| 43 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 44 | 1 1 | 0 0 | 0 0 | 1 1 | 1 1 | 0 0 | 0 0 | 1 1 | 0 0 | 1 1 | 1 1 | 0 0 | 0 0 | 1 1 | 1 1 | 0 0 |
| 45 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 46 | 1 0 | 0 1 | 0 1 | 1 0 | 1 0 | 0 1 | 0 1 | 1 0 | 0 1 | 1 0 | 1 0 | 0 1 | 0 1 | 1 0 | 1 0 | 0 1 |
| 47 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 48 | 1 1 | 1 1 | 1 1 | 1 1 | 0 0 | 0 0 | 0 0 | 0 0 | 0 0 | 0 0 | 0 0 | 0 0 | 1 1 | 1 1 | 1 1 | 1 1 |
| 49 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 50 | 1 0 | 1 0 | 1 0 | 1 0 | 0 1 | 0 1 | 0 1 | 0 1 | 0 1 | 0 1 | 0 1 | 0 1 | 1 0 | 1 0 | 1 0 | 1 0 |
| 51 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 52 | 1 1 | 0 0 | 1 1 | 0 0 | 0 0 | 1 1 | 0 0 | 1 1 | 0 0 | 1 1 | 0 0 | 1 1 | 1 1 | 0 0 | 1 1 | 0 0 |
| 53 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 54 | 1 0 | 0 1 | 1 0 | 0 1 | 0 1 | 1 0 | 0 1 | 1 0 | 0 1 | 1 0 | 0 1 | 1 0 | 1 0 | 0 1 | 1 0 | 0 1 |
| 55 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 56 | 1 1 | 1 1 | 0 0 | 0 0 | 0 0 | 0 0 | 1 1 | 1 1 | 0 0 | 0 0 | 1 1 | 1 1 | 1 1 | 1 1 | 0 0 | 0 0 |
| 57 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 58 | 1 0 | 1 0 | 0 1 | 0 1 | 0 1 | 0 1 | 1 0 | 1 0 | 0 1 | 0 1 | 1 0 | 1 0 | 1 0 | 1 0 | 0 1 | 0 1 |
| 59 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 60 | 1 1 | 0 0 | 0 0 | 1 1 | 0 0 | 1 1 | 1 1 | 0 0 | 0 0 | 1 1 | 1 1 | 0 0 | 1 1 | 0 0 | 0 0 | 1 1 |
| 61 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 62 | 1 0 | 0 1 | 0 1 | 1 0 | 0 1 | 1 0 | 1 0 | 0 1 | 0 1 | 1 0 | 1 0 | 0 1 | 1 0 | 0 1 | 0 1 | 1 0 |
| 63 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |

| Modulation | Switch State per Walsh Chip Pair "01" within the Walsh Symbol | | | | | | | | | | | | | | | |
|---|---|---|---|---|---|---|---|---|---|---|---|---|---|---|---|---|
| Symbol Index | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
| 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 1 | 1 1 | 1 1 | 1 1 | 1 1 | 1 1 | 1 1 | 1 1 | 1 1 | 1 1 | 1 1 | 1 1 | 1 1 | 1 1 | 1 1 | 1 1 | 1 1 |
| 2 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 3 | 1 0 | 1 0 | 1 0 | 1 0 | 1 0 | 1 0 | 1 0 | 1 0 | 1 0 | 1 0 | 1 0 | 1 0 | 1 0 | 1 0 | 1 0 | 1 0 |
| 4 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 5 | 1 1 | 0 0 | 1 1 | 0 0 | 1 1 | 0 0 | 1 1 | 0 0 | 1 1 | 0 0 | 1 1 | 0 0 | 1 1 | 0 0 | 1 1 | 0 0 |
| 6 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 7 | 1 0 | 0 1 | 1 0 | 0 1 | 1 0 | 0 1 | 1 0 | 0 1 | 1 0 | 0 1 | 1 0 | 0 1 | 1 0 | 0 1 | 1 0 | 0 1 |
| 8 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 9 | 1 1 | 1 1 | 0 0 | 0 0 | 1 1 | 1 1 | 0 0 | 0 0 | 1 1 | 1 1 | 0 0 | 0 0 | 1 1 | 1 1 | 0 0 | 0 0 |
| 10 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 11 | 1 0 | 1 0 | 0 1 | 0 1 | 1 0 | 1 0 | 0 1 | 0 1 | 1 0 | 1 0 | 0 1 | 0 1 | 1 0 | 1 0 | 0 1 | 0 1 |
| 12 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 13 | 1 1 | 0 0 | 0 0 | 1 1 | 1 1 | 0 0 | 0 0 | 1 1 | 1 1 | 0 0 | 0 0 | 1 1 | 1 1 | 0 0 | 0 0 | 1 1 |
| 14 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 15 | 1 0 | 0 1 | 0 1 | 1 0 | 1 0 | 0 1 | 0 1 | 1 0 | 1 0 | 0 1 | 0 1 | 0 0 | 1 0 | 0 1 | 0 1 | 1 0 |
| 16 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 17 | 1 1 | 1 1 | 1 1 | 1 1 | 0 0 | 0 0 | 0 0 | 0 0 | 1 1 | 1 1 | 1 1 | 1 1 | 0 0 | 0 0 | 0 0 | 0 0 |
| 18 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 19 | 1 0 | 1 0 | 1 0 | 1 0 | 0 1 | 0 1 | 0 1 | 0 1 | 1 0 | 1 0 | 1 0 | 1 0 | 0 1 | 0 1 | 0 1 | 0 1 |
| 20 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 21 | 1 1 | 0 0 | 1 1 | 0 0 | 0 0 | 1 1 | 0 0 | 1 1 | 1 1 | 0 0 | 1 1 | 0 0 | 0 0 | 1 1 | 0 0 | 1 1 |
| 22 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 23 | 1 0 | 0 1 | 1 0 | 0 1 | 0 1 | 1 0 | 0 1 | 1 0 | 1 0 | 0 1 | 1 0 | 0 1 | 0 1 | 1 0 | 0 1 | 1 0 |
| 24 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 25 | 1 1 | 1 1 | 0 0 | 0 0 | 0 0 | 0 0 | 1 1 | 1 1 | 1 1 | 1 1 | 0 0 | 0 0 | 0 0 | 0 0 | 1 1 | 1 1 |
| 26 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 27 | 1 0 | 1 0 | 0 1 | 0 1 | 0 1 | 0 1 | 1 0 | 1 0 | 1 0 | 1 0 | 0 1 | 0 1 | 0 1 | 0 1 | 1 0 | 1 0 |
| 28 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 29 | 1 1 | 0 0 | 0 0 | 1 1 | 0 0 | 1 1 | 1 1 | 0 0 | 1 1 | 0 0 | 0 0 | 1 1 | 0 0 | 1 1 | 1 1 | 0 0 |
| 30 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 31 | 1 0 | 0 1 | 0 1 | 1 0 | 0 1 | 1 0 | 1 0 | 0 1 | 1 0 | 0 1 | 0 1 | 1 0 | 0 1 | 1 0 | 1 0 | 0 1 |
| 32 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 33 | 1 1 | 1 1 | 1 1 | 1 1 | 1 1 | 1 1 | 1 1 | 1 1 | 0 0 | 0 0 | 0 0 | 0 0 | 0 0 | 0 0 | 0 0 | 0 0 |
| 34 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 35 | 1 0 | 1 0 | 1 0 | 1 0 | 1 0 | 1 0 | 1 0 | 1 0 | 0 1 | 0 1 | 0 1 | 0 1 | 0 1 | 0 1 | 0 1 | 0 1 |
| 36 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 37 | 1 1 | 0 0 | 1 1 | 0 0 | 1 1 | 0 0 | 1 1 | 0 0 | 0 0 | 1 1 | 0 0 | 1 1 | 0 0 | 1 1 | 0 0 | 1 1 |
| 38 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 39 | 1 0 | 0 1 | 1 0 | 0 1 | 1 0 | 0 1 | 1 0 | 0 1 | 0 0 | 0 1 | 1 0 | 0 1 | 1 0 | 0 1 | 1 0 | 1 0 |
| 40 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 41 | 1 1 | 1 1 | 0 0 | 0 0 | 1 1 | 1 1 | 0 0 | 0 0 | 0 0 | 0 0 | 1 1 | 1 1 | 0 0 | 0 0 | 1 1 | 1 1 |
| 42 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 43 | 1 0 | 1 0 | 0 1 | 0 1 | 1 0 | 1 0 | 0 1 | 0 1 | 0 1 | 0 1 | 1 0 | 1 0 | 0 1 | 0 1 | 1 0 | 1 0 |
| 44 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 45 | 1 1 | 0 0 | 0 0 | 1 1 | 1 1 | 0 0 | 0 0 | 1 1 | 0 0 | 1 1 | 1 1 | 0 0 | 0 0 | 1 1 | 1 1 | 0 0 |
| 46 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 47 | 1 0 | 0 1 | 0 1 | 1 0 | 1 0 | 0 1 | 0 1 | 1 0 | 0 1 | 1 0 | 1 0 | 0 1 | 0 1 | 1 0 | 1 0 | 0 1 |
| 48 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 49 | 1 1 | 1 1 | 1 1 | 1 1 | 0 0 | 0 0 | 0 0 | 0 0 | 0 0 | 0 0 | 0 0 | 1 1 | 1 1 | 1 1 | 1 1 | 1 1 |
| 50 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 51 | 1 0 | 1 0 | 1 0 | 1 0 | 0 1 | 0 1 | 0 1 | 0 1 | 0 1 | 0 1 | 0 1 | 0 1 | 1 0 | 1 0 | 1 0 | 1 0 |
| 52 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 53 | 1 1 | 0 0 | 1 1 | 0 0 | 0 0 | 1 1 | 0 0 | 1 1 | 0 0 | 1 1 | 0 0 | 1 1 | 1 1 | 0 0 | 1 1 | 0 0 |
| 54 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 55 | 1 0 | 0 1 | 1 0 | 0 1 | 0 1 | 1 0 | 0 1 | 1 0 | 0 1 | 1 0 | 0 1 | 1 0 | 1 0 | 0 1 | 1 0 | 0 1 |
| 56 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 57 | 1 1 | 1 1 | 0 0 | 0 0 | 0 0 | 0 0 | 1 1 | 1 1 | 0 0 | 0 0 | 1 1 | 1 1 | 1 1 | 1 1 | 0 0 | 0 0 |
| 58 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 59 | 1 0 | 1 0 | 0 1 | 0 1 | 0 1 | 0 1 | 1 0 | 1 0 | 0 1 | 0 1 | 1 0 | 1 0 | 1 0 | 1 0 | 0 1 | 0 1 |
| 60 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 61 | 1 1 | 0 0 | 0 0 | 1 1 | 0 0 | 1 1 | 1 1 | 0 0 | 0 0 | 1 1 | 1 1 | 0 0 | 1 1 | 0 0 | 0 0 | 1 1 |
| 62 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 63 | 1 0 | 0 1 | 0 1 | 1 0 | 0 1 | 1 0 | 1 0 | 0 1 | 0 1 | 1 0 | 1 0 | 0 1 | 1 0 | 0 1 | 0 1 | 1 0 |

APPENDIX D

Code Mask 10 Table

| Modulation Symbol Index | \_Switch State per Walsh Chip Pair within the Walsh Symbol\_ ||||||||||||||||
|---|---|---|---|---|---|---|---|---|---|---|---|---|---|---|---|---|
| | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
| 0  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 1  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 2  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 3  | 0 1 | 0 1 | 0 1 | 0 1 | 0 1 | 0 1 | 0 1 | 0 1 | 0 1 | 0 1 | 0 1 | 0 1 | 0 1 | 0 1 | 0 1 | 0 1 |
| 4  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 5  | 0 0 | 1 1 | 0 0 | 1 1 | 0 0 | 1 1 | 0 0 | 1 1 | 0 0 | 1 1 | 0 0 | 1 1 | 0 0 | 1 1 | 0 0 | 1 1 |
| 6  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 7  | 0 1 | 1 0 | 0 1 | 1 0 | 0 1 | 1 0 | 0 1 | 1 0 | 0 1 | 1 0 | 0 1 | 1 0 | 0 1 | 1 0 | 0 1 | 1 0 |
| 8  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 9  | 0 0 | 0 0 | 1 1 | 1 1 | 0 0 | 0 0 | 1 1 | 1 1 | 0 0 | 0 0 | 1 1 | 1 1 | 0 0 | 0 0 | 1 1 | 1 1 |
| 10 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 11 | 0 1 | 0 1 | 1 0 | 1 0 | 0 1 | 0 1 | 1 0 | 1 0 | 0 1 | 0 1 | 1 0 | 1 0 | 0 1 | 0 1 | 1 0 | 1 0 |
| 12 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 13 | 0 0 | 1 1 | 1 1 | 0 0 | 0 0 | 1 1 | 1 1 | 0 0 | 0 0 | 1 1 | 1 1 | 0 0 | 0 0 | 1 1 | 1 1 | 0 0 |
| 14 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 15 | 0 1 | 1 0 | 1 0 | 0 1 | 0 1 | 1 0 | 1 0 | 0 1 | 0 1 | 1 0 | 1 0 | 0 1 | 0 1 | 1 0 | 1 0 | 0 1 |
| 16 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 17 | 0 0 | 0 0 | 0 0 | 0 0 | 1 1 | 1 1 | 1 1 | 1 1 | 0 0 | 0 0 | 0 0 | 0 0 | 1 1 | 1 1 | 1 1 | 1 1 |
| 18 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 19 | 0 1 | 0 1 | 0 1 | 0 1 | 1 0 | 1 0 | 1 0 | 1 0 | 0 1 | 0 1 | 0 1 | 0 1 | 1 0 | 1 0 | 1 0 | 1 0 |
| 20 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 21 | 0 0 | 1 1 | 0 0 | 1 1 | 1 1 | 0 0 | 1 1 | 0 0 | 0 0 | 1 1 | 0 0 | 1 1 | 1 1 | 0 0 | 1 1 | 0 0 |
| 22 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 23 | 0 1 | 1 0 | 0 1 | 1 0 | 1 0 | 0 1 | 1 0 | 0 1 | 0 1 | 1 0 | 0 1 | 1 0 | 1 0 | 0 1 | 1 0 | 0 1 |
| 24 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 25 | 0 0 | 0 0 | 1 1 | 1 1 | 1 1 | 1 1 | 0 0 | 0 0 | 0 0 | 0 0 | 1 1 | 1 1 | 1 1 | 1 1 | 0 0 | 0 0 |
| 26 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 27 | 0 1 | 0 1 | 1 0 | 1 0 | 1 0 | 1 0 | 0 1 | 0 1 | 0 1 | 0 1 | 1 0 | 1 0 | 1 0 | 1 0 | 0 1 | 0 1 |
| 28 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 29 | 0 0 | 1 1 | 1 1 | 0 0 | 1 1 | 0 0 | 0 0 | 1 1 | 0 0 | 1 1 | 1 1 | 0 0 | 1 1 | 0 0 | 0 0 | 1 1 |
| 30 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 31 | 0 1 | 1 0 | 1 0 | 0 1 | 1 0 | 0 1 | 0 1 | 1 0 | 0 1 | 1 0 | 1 0 | 0 1 | 1 0 | 0 1 | 0 1 | 1 0 |
| 32 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 33 | 0 0 | 0 0 | 0 0 | 0 0 | 0 0 | 0 0 | 0 0 | 0 0 | 1 1 | 1 1 | 1 1 | 1 1 | 1 1 | 1 1 | 1 1 | 1 1 |
| 34 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 35 | 0 1 | 0 1 | 0 1 | 0 1 | 0 1 | 0 1 | 0 1 | 0 1 | 1 0 | 1 0 | 1 0 | 1 0 | 1 0 | 1 0 | 1 0 | 1 0 |
| 36 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 37 | 0 0 | 1 1 | 0 0 | 1 1 | 0 0 | 1 1 | 0 0 | 1 1 | 1 1 | 0 0 | 1 1 | 0 0 | 1 1 | 0 0 | 1 1 | 0 0 |
| 38 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 39 | 0 1 | 1 0 | 0 1 | 1 0 | 0 1 | 1 0 | 0 1 | 1 0 | 1 0 | 0 1 | 1 0 | 0 1 | 1 0 | 0 1 | 1 0 | 0 1 |
| 40 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 41 | 0 0 | 0 0 | 1 1 | 1 1 | 0 0 | 0 0 | 1 1 | 1 1 | 1 1 | 1 1 | 0 0 | 0 0 | 1 1 | 1 1 | 0 0 | 0 0 |
| 42 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 43 | 0 1 | 0 1 | 1 0 | 1 0 | 0 1 | 0 1 | 1 0 | 1 0 | 1 0 | 1 0 | 0 1 | 0 1 | 1 0 | 1 0 | 0 1 | 0 1 |
| 44 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 45 | 0 0 | 1 1 | 1 1 | 0 0 | 0 0 | 1 1 | 1 1 | 0 0 | 1 1 | 0 0 | 0 0 | 1 1 | 1 1 | 0 0 | 0 0 | 1 1 |
| 46 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 47 | 0 1 | 1 0 | 1 0 | 0 1 | 0 1 | 1 0 | 1 0 | 0 1 | 1 0 | 0 1 | 0 1 | 1 0 | 1 0 | 0 1 | 0 1 | 1 0 |
| 48 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 49 | 0 0 | 0 0 | 0 0 | 0 0 | 1 1 | 1 1 | 1 1 | 1 1 | 1 1 | 1 1 | 1 1 | 1 1 | 0 0 | 0 0 | 0 0 | 0 0 |
| 50 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 51 | 0 1 | 0 1 | 0 1 | 0 1 | 1 0 | 1 0 | 1 0 | 1 0 | 1 0 | 1 0 | 1 0 | 1 0 | 0 1 | 0 1 | 0 1 | 0 1 |
| 52 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 53 | 0 0 | 1 1 | 0 0 | 1 1 | 1 1 | 0 0 | 1 1 | 0 0 | 1 1 | 0 0 | 1 1 | 0 0 | 0 0 | 1 1 | 0 0 | 1 1 |
| 54 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 55 | 0 1 | 1 0 | 0 1 | 1 0 | 1 0 | 0 1 | 1 0 | 0 1 | 1 0 | 0 1 | 1 0 | 0 1 | 0 1 | 1 0 | 0 1 | 1 0 |
| 56 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 57 | 0 0 | 0 0 | 1 1 | 1 1 | 1 1 | 1 1 | 0 0 | 0 0 | 1 1 | 1 1 | 0 0 | 0 0 | 0 0 | 0 0 | 1 1 | 1 1 |
| 58 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 59 | 0 1 | 0 1 | 1 0 | 1 0 | 1 0 | 1 0 | 0 1 | 0 1 | 1 0 | 1 0 | 0 1 | 0 1 | 0 1 | 0 1 | 1 0 | 1 0 |
| 60 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 61 | 0 0 | 1 1 | 1 1 | 0 0 | 1 1 | 0 0 | 0 0 | 1 1 | 1 1 | 0 0 | 0 0 | 1 1 | 0 0 | 1 1 | 1 1 | 0 0 |
| 62 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 63 | 0 1 | 1 0 | 1 0 | 0 1 | 1 0 | 0 1 | 0 1 | 1 0 | 1 0 | 0 1 | 0 1 | 1 0 | 0 1 | 1 0 | 1 0 | 0 1 |

APPENDIX E

Code Mask 11 Table

Modulation — Switch State per Walsh Chip Pair within the Walsh Symbol

| Symbol Index | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 0  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 1  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 2  | 0 1 | 0 1 | 0 1 | 0 1 | 0 1 | 0 1 | 0 1 | 0 1 | 0 1 | 0 1 | 0 1 | 0 1 | 0 1 | 0 1 | 0 1 | 0 1 |
| 3  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 4  | 0 0 | 1 1 | 0 0 | 1 1 | 0 0 | 1 1 | 0 0 | 1 1 | 0 0 | 1 1 | 0 0 | 1 1 | 0 0 | 1 1 | 0 0 | 1 1 |
| 5  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 6  | 0 1 | 1 0 | 0 1 | 1 0 | 0 1 | 1 0 | 0 1 | 1 0 | 0 1 | 1 0 | 0 1 | 1 0 | 0 1 | 1 0 | 0 1 | 1 0 |
| 7  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 8  | 0 0 | 0 0 | 1 1 | 1 1 | 0 0 | 0 0 | 1 1 | 1 1 | 0 0 | 0 0 | 1 1 | 1 1 | 0 0 | 0 0 | 1 1 | 1 1 |
| 9  | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 10 | 0 1 | 0 1 | 1 0 | 1 0 | 0 1 | 0 1 | 1 0 | 1 0 | 0 1 | 0 1 | 1 0 | 1 0 | 0 1 | 0 1 | 1 0 | 1 0 |
| 11 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 12 | 0 0 | 1 1 | 1 1 | 0 0 | 0 0 | 1 1 | 1 1 | 0 0 | 0 0 | 1 1 | 1 1 | 0 0 | 0 0 | 1 1 | 1 1 | 0 0 |
| 13 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 14 | 0 1 | 1 0 | 1 0 | 0 1 | 0 1 | 1 0 | 1 0 | 0 1 | 0 1 | 1 0 | 1 0 | 0 1 | 0 1 | 1 0 | 1 0 | 0 1 |
| 15 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 16 | 0 0 | 0 0 | 0 0 | 0 0 | 1 1 | 1 1 | 1 1 | 1 1 | 0 0 | 0 0 | 0 0 | 0 0 | 1 1 | 1 1 | 1 1 | 1 1 |
| 17 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 18 | 0 1 | 0 1 | 0 1 | 0 1 | 1 0 | 1 0 | 1 0 | 1 0 | 0 1 | 0 1 | 0 1 | 0 1 | 1 0 | 1 0 | 1 0 | 1 0 |
| 19 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 20 | 0 0 | 1 1 | 0 0 | 1 1 | 1 1 | 0 0 | 1 1 | 0 0 | 0 0 | 1 1 | 0 0 | 1 1 | 1 1 | 0 0 | 1 1 | 0 0 |
| 21 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 22 | 0 1 | 1 0 | 0 1 | 1 0 | 1 0 | 0 1 | 1 0 | 0 1 | 0 1 | 1 0 | 0 1 | 1 0 | 1 0 | 0 1 | 1 0 | 0 1 |
| 23 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 24 | 0 0 | 0 0 | 1 1 | 1 1 | 1 1 | 1 1 | 0 0 | 0 0 | 0 0 | 0 0 | 1 1 | 1 1 | 1 1 | 1 1 | 0 0 | 0 0 |
| 25 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 26 | 0 1 | 0 1 | 1 0 | 1 0 | 1 0 | 1 0 | 0 1 | 0 1 | 0 1 | 0 1 | 1 0 | 1 0 | 1 0 | 1 0 | 0 1 | 0 1 |
| 27 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 28 | 0 0 | 1 1 | 1 1 | 0 0 | 1 1 | 0 0 | 0 0 | 1 1 | 0 0 | 1 1 | 1 1 | 0 0 | 1 1 | 0 0 | 0 0 | 1 1 |
| 29 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 30 | 0 1 | 1 0 | 1 0 | 0 1 | 1 0 | 0 1 | 0 1 | 1 0 | 0 1 | 1 0 | 1 0 | 0 1 | 1 0 | 0 1 | 0 1 | 1 0 |
| 31 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 32 | 0 0 | 0 0 | 0 0 | 0 0 | 0 0 | 0 0 | 0 0 | 0 0 | 1 1 | 1 1 | 1 1 | 1 1 | 1 1 | 1 1 | 1 1 | 1 1 |
| 33 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 34 | 0 1 | 0 1 | 0 1 | 0 1 | 0 1 | 0 1 | 0 1 | 0 1 | 1 0 | 1 0 | 1 0 | 1 0 | 1 0 | 1 0 | 1 0 | 1 0 |
| 35 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 36 | 0 0 | 1 1 | 0 0 | 1 1 | 0 0 | 1 1 | 0 0 | 1 1 | 1 1 | 0 0 | 1 1 | 0 0 | 1 1 | 0 0 | 1 1 | 0 0 |
| 37 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 38 | 0 1 | 1 0 | 0 1 | 1 0 | 0 1 | 1 0 | 0 1 | 1 0 | 1 0 | 0 1 | 1 0 | 0 1 | 1 0 | 0 1 | 1 0 | 0 1 |
| 39 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 40 | 0 0 | 0 0 | 1 1 | 1 1 | 0 0 | 0 0 | 1 1 | 1 1 | 1 1 | 1 1 | 0 0 | 0 0 | 1 1 | 1 1 | 0 0 | 0 0 |
| 41 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 42 | 0 1 | 0 1 | 1 0 | 1 0 | 0 1 | 0 1 | 1 0 | 1 0 | 1 0 | 1 0 | 0 1 | 0 1 | 1 0 | 1 0 | 0 1 | 0 1 |
| 43 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 44 | 0 0 | 1 1 | 1 1 | 0 0 | 0 0 | 1 1 | 1 1 | 0 0 | 1 1 | 0 0 | 0 0 | 1 1 | 1 1 | 0 0 | 0 0 | 1 1 |
| 45 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 46 | 0 1 | 1 0 | 1 0 | 0 1 | 0 1 | 1 0 | 1 0 | 0 1 | 1 0 | 0 1 | 0 1 | 1 0 | 1 0 | 0 1 | 0 1 | 1 0 |
| 47 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 48 | 0 0 | 0 0 | 0 0 | 0 0 | 1 1 | 1 1 | 1 1 | 1 1 | 1 1 | 1 1 | 1 1 | 1 1 | 0 0 | 0 0 | 0 0 | 0 0 |
| 49 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 50 | 0 1 | 0 1 | 0 1 | 0 1 | 1 0 | 1 0 | 1 0 | 1 0 | 1 0 | 1 0 | 1 0 | 1 0 | 0 1 | 0 1 | 0 1 | 0 1 |
| 51 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 52 | 0 0 | 1 1 | 0 0 | 1 1 | 1 1 | 0 0 | 1 1 | 0 0 | 1 1 | 0 0 | 1 1 | 0 0 | 0 0 | 1 1 | 0 0 | 1 1 |
| 53 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 54 | 0 1 | 1 0 | 0 1 | 1 0 | 1 0 | 0 1 | 1 0 | 0 1 | 1 0 | 0 1 | 1 0 | 0 1 | 0 1 | 1 0 | 0 1 | 1 0 |
| 55 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 56 | 0 0 | 0 0 | 1 1 | 1 1 | 1 1 | 1 1 | 0 0 | 0 0 | 1 1 | 1 1 | 0 0 | 0 0 | 0 0 | 0 0 | 1 1 | 1 1 |
| 57 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 58 | 0 1 | 0 1 | 1 0 | 1 0 | 1 0 | 1 0 | 0 1 | 0 1 | 1 0 | 1 0 | 0 1 | 0 1 | 0 1 | 0 1 | 1 0 | 1 0 |
| 59 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 60 | 0 0 | 1 1 | 1 1 | 0 0 | 1 1 | 0 0 | 0 0 | 1 1 | 1 1 | 0 0 | 0 0 | 1 1 | 0 0 | 1 1 | 1 1 | 0 0 |
| 61 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 62 | 0 1 | 1 0 | 1 0 | 0 1 | 1 0 | 0 1 | 0 1 | 1 0 | 1 0 | 0 1 | 0 1 | 1 0 | 0 1 | 1 0 | 1 0 | 0 1 |
| 63 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |

What is claimed is:

1. A demodulator for demodulating a set of S possible orthogonal modulation codes received serially as binary data, wherein each of said S possible orthogonal modulation codes comprises M binary bits representing an N-bit data symbol and wherein $M=2^N$, said demodulator comprising:
- a Logic 00 input detector, a Logic 01 input detector, a Logic 10 input detector and a Logic 11 input detector, wherein each of said Logic 00 input detector, said Logic 01 input detector, said Logic 10 input detector, and said Logic 11 input detector compares sequential pairs of said M binary bits of said serially received orthogonal modulation codes to a respective one of a Logic 00 value, a Logic 01 value, a Logic 10 value, and a Logic 11 value and outputs a [+1,+1] signal if a match occurs and outputs a [−1,−1] signal if a match does not occur;
- a summation circuit comprising S accumulators;
- a storage array capable of storing S Logic 00 code masks, each of said S Logic 00 code masks associated with one of said S possible orthogonal modulation codes, wherein a kth Logic 00 code mask comprises M/2 Logic 00 code mask bits, each of said M/2 Logic 00 code mask bits associated with a corresponding one of M/2 sequential pairs of M binary bits in a kth orthogonal modulation code, wherein said each M/2 Logic 00 code mask bit is a Logic 1 if said corresponding sequential pair of said M binary bits in said kth orthogonal modulation code is equal to a Logic 00 value and is equal to Logic 0 otherwise; and
- an input decision circuit capable of detecting a [+1,+1] signal output by said Logic 00 input detector after a comparison of a jth sequential pair of said M/2 sequential pairs of said M binary bits to a Logic 00 value and, in response to said detection, adding said [+1,+1] signal to a kth one of said S accumulators in said summation circuit if a jth one of said M/2 Logic 00 code mask bits in said kth Logic 00 code mask in said storage array is equal to Logic 1.

2. The demodulator as set forth in claim 1 where said storage array is further capable of storing S Logic 01 code masks, each of said S Logic 01 code masks associated with one of said S possible orthogonal modulation codes, wherein a kth Logic 01 code mask comprises M/2 Logic 01 code mask bits, each of said M/2 Logic 01 code mask bits associated with a corresponding one of M/2 sequential pairs of M binary bits in a kth orthogonal modulation code, wherein said each M/2 Logic 01 code mask bit is a Logic 1 if said corresponding sequential pair of said M binary bits in said kth orthogonal modulation code is equal to a Logic 01 value and is equal to Logic 0 otherwise.

3. The demodulator as set forth in claim 2 where said input decision circuit is further capable of detecting a [+1,+1] signal output by said Logic 01 input detector after a comparison of a jth sequential pair of said M/2 sequential pairs of said M binary bits to a Logic 01 value and, in response to said detection, adding said [+1,+1] signal to a kth one of said S accumulators in said summation circuit if a jth one of said M/2 Logic 01 code mask bits in said kth Logic 01 code mask in said storage array is equal to Logic 1.

4. The demodulator as set forth in claim 3 where said storage array is further capable of storing S Logic 10 code masks, each of said S Logic 10 code masks associated with one of said S possible orthogonal modulation codes, wherein a kth Logic 10 code mask comprises M/2 Logic 10 code mask bits, each of said M/2 Logic 10 code mask bits associated with a corresponding one of M/2 sequential pairs of M binary bits in a kth orthogonal modulation code, wherein said each M/2 Logic 10 code mask bit is a Logic 1 if said corresponding sequential pair of said M binary bits in said kth orthogonal modulation code is equal to a Logic 10 value and is equal to Logic 0 otherwise.

5. The demodulator as set forth in claim 4 where said input decision circuit is further capable of detecting a [+1,+1] signal output by said Logic 10 input detector after a comparison of a jth sequential pair of said M/2 sequential pairs of said M binary bits to a Logic 10 value and, in response to said detection, adding said [+1,+1] signal to a kth one of said S accumulators in said summation circuit if a jth one of said M/2 Logic 10 code mask bits in said kth Logic 10 code mask in said storage array is equal to Logic 1.

6. The demodulator as set forth in claim 5 where said storage array is further capable of storing S Logic 11 code masks, each of said S Logic 11 code masks associated with one of said S possible orthogonal modulation codes, wherein a kth Logic 11 code mask comprises M/2 Logic 11 code mask bits, each of said M/2 Logic 11 code mask bits associated with a corresponding one of M/2 sequential pairs of M binary bits in a kth orthogonal modulation code, wherein said each M/2 Logic 11 code mask bit is a Logic 1 if said corresponding sequential pair of said M binary bits in said kth orthogonal modulation code is equal to a Logic 11 value and is equal to Logic 0 otherwise.

7. The demodulator as set forth in claim 6 where said input decision circuit is further capable of detecting a [+1,+1] signal output by said Logic 11 input detector after a comparison of a jth sequential pair of said M/2 sequential pairs of said M binary bits to a Logic 11 value and, in response to said detection, adding said [+1,+1] signal to a kth one of said S accumulators in said summation circuit if a jth one of said M/2 Logic 11 code mask bits in said kth Logic 11 code mask in said storage array is equal to Logic 1.

8. The demodulator as set forth in claim 7 further comprising a code selection circuit capable of reading a sum value from each said S accumulators and identifying an accumulator containing a maximum sum value.

9. The demodulator as set forth in claim 8 where said code selection circuit outputs one of 2M N-bit data symbols corresponding to said identified accumulator containing said maximum sum value.

10. The demodulator as set forth in claim 9 where N=6 and M=2N=64.

11. The demodulator as set forth in claim 10 where S=64.

12. The demodulator as set forth in claim 11 where said orthogonal modulation codes are Walsh codes.

13. A code division multiple access (CDMA) wireless network comprising a plurality of base transceiver stations capable of communicating with access terminals located in a coverage area of said wireless network, wherein a first one of said plurality of base transceiver stations comprises:
- a demodulator for demodulating a set of S possible orthogonal modulation codes received serially as binary data, wherein each of said S possible orthogonal modulation codes comprises M binary bits representing an N-bit data symbol and wherein $M=2^N$, said demodulator comprising:
- a Logic 00 input detector, a Logic 01 input detector, a Logic 10 input detector and a Logic 11 input detector, wherein each of said Logic 00 input detector, said Logic 01 input detector, said Logic 10 input detector, and said Logic 11 input detector compares sequential pairs of said M binary bits of said serially received orthogonal modulation codes to a respective one of a Logic 00 value, a Logic 01 value, a Logic 10 value, and a Logic 11 value and outputs a [+1,+1] signal if a match occurs and outputs a [−1,−1] signal if a match does not occur;

a summation circuit comprising S accumulators;

a storage array capable of storing S Logic 00 code masks, each of said S Logic 00 code masks associated with one of said S possible orthogonal modulation codes, wherein a kth Logic 00 code mask comprises M/2 Logic 00 code mask bits, each of said M/2 Logic 00 code mask bits associated with a corresponding one of M/2 sequential pairs of M binary bits in a kth orthogonal modulation code, wherein said each M/2 Logic 00 code mask bit is a Logic 1 if said corresponding sequential pair of said M binary bits in said kth orthogonal modulation code is equal to a Logic 00 value and is equal to Logic 0 otherwise; and an input decision circuit capable of detecting a [+1,+1] signal output by said Logic 00 input detector after a comparison of a jth sequential pair of said M/2 sequential pairs of said M binary bits to a Logic 00 value and, in response to said detection, adding said [+1,+1] signal to a kth one of said S accumulators in said summation circuit if a jth one of said M/2 Logic 00 code mask bits in said kth Logic 00 code mask in said storage array is equal to Logic 1.

14. The CDMA wireless network as set forth in claim 13 where said storage array is further capable of storing S Logic 01 code masks, each of said S Logic 01 code masks associated with one of said S possible orthogonal modulation codes, wherein a kth Logic 01 code mask comprises M/2 Logic 01 code mask bits, each of said M/2 Logic 01 code mask bits associated with a corresponding one of M/2 sequential pairs of M binary bits in a kth orthogonal modulation code, wherein said each M/2 Logic 01 code mask bit is a Logic 1 if said corresponding sequential pair of said M binary bits in said kth orthogonal modulation code is equal to a Logic 01 value and is equal to Logic 0 otherwise.

15. The CDMA wireless network as set forth in claim 14 where said input decision circuit is further capable of detecting a [+1,+1] signal output by said Logic 01 input detector after a comparison of a jth sequential pair of said M/2 sequential pairs of said M binary bits to a Logic 01 value and, in response to said detection, adding said [+1,+1] signal to a kth one of said S accumulators in said summation circuit if a jth one of said M/2 Logic 01 code mask bits in said kth Logic 01 code mask in said storage array is equal to Logic 1.

16. The CDMA wireless network as set forth in claim 15 where said storage array is further capable of storing S Logic 10 code masks, each of said S Logic 10 code masks associated with one of said S possible orthogonal modulation codes, wherein a kth Logic 10 code mask comprises M/2 Logic 10 code mask bits, each of said M/2 Logic 10 code mask bits associated with a corresponding one of M/2 sequential pairs of M binary bits in a kth orthogonal modulation code, wherein said each M/2 Logic 10 code mask bit is a Logic 1 if said corresponding sequential pair of said M binary bits in said kth orthogonal modulation code is equal to a Logic 10 value and is equal to Logic 0 otherwise.

17. The CDMA wireless network as set forth in claim 16 where said input decision circuit is further capable of detecting a [+1,+1] signal output by said Logic 10 input detector after a comparison of a jth sequential pair of said M/2 sequential pairs of said M binary bits to a Logic 10 value and, in response to said detection, adding said [+1,+1] signal to a kth one of said S accumulators in said summation circuit if a jth one of said M/2 Logic 10 code mask bits in said kth Logic 10 code mask in said storage array is equal to Logic 1.

18. The CDMA wireless network as set forth in claim 17 where said storage array is further capable of storing S Logic 11 code masks, each of said S Logic 11 code masks associated with one of said S possible orthogonal modulation codes, wherein a kth Logic 11 code mask comprises M/2 Logic 11 code mask bits, each of said M/2 Logic 11 code mask bits associated with a corresponding one of M/2 sequential pairs of M binary bits in a kth orthogonal modulation code, wherein said each M/2 Logic 11 code mask bit is a Logic 1 if said corresponding sequential pair of said M binary bits in said kth orthogonal modulation code is equal to a Logic 11 value and is equal to Logic 0 otherwise.

19. The CDMA wireless network as set forth in claim 18 where said input decision circuit is further capable of detecting a [+1,+1] signal output by said Logic 11 input detector after a comparison of a jth sequential pair of said M/2 sequential pairs of said M binary bits to a Logic 11 value and, in response to said detection, adding said [+1,+1] signal to a kth one of said S accumulators in said summation circuit if a jth one of said M/2 Logic 11 code mask bits in said kth Logic 11 code mask in said storage array is equal to Logic 1.

20. The CDMA wireless network as set forth in claim 19 further comprising a code selection circuit capable of reading a sum value from each said S accumulators and identifying an accumulator containing a maximum sum value.

21. The CDMA wireless network as set forth in claim 20 where said code selection circuit outputs one of $2^M$ N-bit data symbols corresponding to said identified accumulator containing said maximum sum value.

22. The CDMA wireless network as set forth in claim 21 where N=6 and $M=2^N=64$.

23. The CDMA wireless network as set forth in claim 22 where S=64.

24. The CDMA wireless network as set forth in claim 23 where said orthogonal modulation codes are Walsh codes.

* * * * *

UNITED STATES PATENT AND TRADEMARK OFFICE
CERTIFICATE OF CORRECTION

PATENT NO. : 7,095,809 B2
APPLICATION NO. : 10/037454
DATED : August 22, 2006
INVENTOR(S) : Joseph Cleveland and Adnan Kavak It is certified that error appears in the above-identified patent and that said Letters Patent is hereby corrected as shown below:

Column 27, Claim 4, line 62, delete "where" and insert -- wherein --

Column 28, Claim 5, line 7, delete "where" and insert -- wherein --

Column 28, Claim 6, line 17, delete "where" and insert -- wherein --

Column 28, Claim 7, line 29, delete "where" and insert -- wherein --

Column 28, Claim 9, line 43, delete "where" and insert -- wherein --

Column 28, Claim 10, line 47, delete "where" and insert -- wherein --

Column 28, Claim 11, line 49, delete "where" and insert -- wherein --

Column 28, Claim 12, line 50, delete "where" and insert -- wherein --

Column 29, Claim 14, line 30, delete "where" and insert -- wherein --

Column 29, Claim 15, line 42, delete "where" and insert -- wherein --

Column 29, Claim 16, line 52, delete "where" and insert -- wherein --

Column 30, Claim 17, line 9, delete "where" and insert -- wherein --

Column 30, Claim 18, line 19, delete "where" and insert -- wherein --

UNITED STATES PATENT AND TRADEMARK OFFICE
CERTIFICATE OF CORRECTION

PATENT NO. : 7,095,809 B2
APPLICATION NO. : 10/037454
DATED : August 22, 2006
INVENTOR(S) : Joseph Cleveland and Adnan Kavak It is certified that error appears in the above-identified patent and that said Letters Patent is hereby corrected as shown below:

Column 30, Claim 19, line 31, delete "where" and insert -- wherein --

Signed and Sealed this

Twenty-ninth Day of September, 2009

David J. Kappos
*Director of the United States Patent and Trademark Office*